United States Patent [19]
Togino et al.

[11] Patent Number: 5,708,529
[45] Date of Patent: Jan. 13, 1998

[54] HEAD-MOUNTED IMAGE DISPLAY APPARATUS

[75] Inventors: Takayoshi Togino, Koganei; Masato Yasugaki, Kunitachi, both of Japan

[73] Assignee: Olympus Optical Co., Ltd., Japan

[21] Appl. No.: 633,499

[22] Filed: Apr. 17, 1996

Related U.S. Application Data

[62] Division of Ser. No. 202,465, Feb. 28, 1994, Pat. No. 5,539,578.

[30] Foreign Application Priority Data

| Mar. 2, 1993 | [JP] | Japan | 5-41421 |
| Nov. 16, 1993 | [JP] | Japan | 5-286647 |

[51] Int. Cl.⁶ .............................. G02B 27/14; G09G 5/00
[52] U.S. Cl. .................... 359/630; 359/631; 345/8
[58] Field of Search .................... 359/630, 631, 359/633; 345/7, 8

[56] References Cited

U.S. PATENT DOCUMENTS

| 4,212,526 | 7/1980 | Yamazaki | 354/225 |
| 4,854,688 | 8/1989 | Hayford | 359/433 |
| 4,874,214 | 10/1989 | Cheysson et al. | 359/15 |
| 5,189,452 | 2/1993 | Hodson | 359/629 |
| 5,200,856 | 4/1993 | Beasusant | 359/630 |
| 5,309,169 | 5/1994 | Lippert | 345/8 |
| 5,408,346 | 4/1995 | Trissel | 359/631 |
| 5,459,612 | 10/1995 | Ingleton | 359/630 |
| 5,506,728 | 4/1996 | Edwards et al. | 359/629 |
| 5,537,253 | 7/1996 | Cox | 359/630 |
| 5,539,578 | 7/1996 | Togino | 359/630 |

FOREIGN PATENT DOCUMENTS

| 3191389 | 8/1991 | Japan . |
| 7-191274 | 7/1995 | Japan . |

*Primary Examiner*—Georgia Y. Epps
*Assistant Examiner*—Ricky Mack
*Attorney, Agent, or Firm*—Cushman Darby & Cushman Intellectual Property Group of Pillsbury Madison & Sutro, LLP

[57] ABSTRACT

An image display apparatus designed so that the field angle for observation can be widened without causing the substrate of an image display device to interfere with the observer's head and without increasing the overall size of the apparatus. The apparatus includes a two-dimensional image display device (6), an optical path splitting device (4), and a concave ocular mirror (5). The image display device (6) is used as an object point of the concave ocular mirror (5), and the object point is projected in the air as an enlarged image for an observer (1) without effecting image formation in the optical path. In the image display apparatus, either or both the optical path splitting device (4) and the concave ocular mirror (5) are decentered so that the display center (7) of the two-dimensional image display device (6) can be shifted away from the observer's head with respect to a reference axis (8) which perpendicularly intersects the observer's visual axis (3) lying when he or she sees forward.

10 Claims, 14 Drawing Sheets

HEAD-MOUNTED IMAGE DISPLAY APPARATUS

This is a division of application Ser. No. 08/202,465, filed Feb. 28, 1994 now U.S. Pat. No. 5,539,578.

BACKGROUND OF THE INVENTION

The present invention relates to an image display apparatus and, more particularly, to a portable head-mounted image display apparatus which can be retained on the user's head or face.

Helmet- and goggle-type head-mounted image display apparatuses, which are designed to be retained on the user's head or face, have heretofore been developed for the purpose of enabling the user to enjoy virtual reality or a wide-screen image by oneself.

Conventional head-mounted image display apparatuses, which are retained on the observer's head to project a virtual image in the air for observation, include one type in which a virtual image of a two-dimensional image display device, e.g., a liquid crystal display device, is formed by a combination of an optical path splitting device, e.g., a half-mirror or a beam splitter, and a concave ocular mirror, as disclosed, for example, in Japanese Patent Application Laid-Open (KOKAI) No. 03-191389 (1991). This type of head-mounted image display apparatus will be explained below with reference to the sectional view of FIG. 18. A beam splitter surface 4 is disposed in front of an eyeball position (eye point) 2 of an observer 1 so as to diagonally intersect the observer's visual axis 3. A concave ocular mirror 5 is disposed below the beam splitter surface 4 so as to extend substantially parallel to the visual axis 3, and a two-dimensional image display device 6 is disposed to face the concave ocular mirror 5 across the beam splitter surface 4. A reference axis 8 which intersects the visual axis 3 at right angles is disposed to extend through the display center 7 of the two-dimensional image display device 6 and also through the center of the concave ocular mirror 5. In this arrangement, light from the two-dimensional image display device 6 passes through the beam splitter surface 4 and is reflected by the concave ocular mirror 5 and then reflected by the beam splitter surface 4 to reach the eyeball position 2. Thus, a virtual image of the image displayed on the two-dimensional image display device 6 is formed in the air by the action of the concave ocular mirror 5, and the observer can view the displayed image. An outside, real world image can be viewed directly through the beam splitter surface 4.

The conventional head-mounted image display apparatus arranged as described above suffers, however, from the problem that the substrate of the two-dimensional image display device 6, e.g., a liquid crystal display device, is larger in size than the display screen thereof and hence interferes with the observer's head.

The problem of the conventional head-mounted image display apparatus will be explained below more specifically. The two-dimensional image display device 6 needs to raise the pixel density in the display screen thereof and to thereby increase the number of pixels per unit area in order to realize a high-definition display. Therefore, it is necessary to achieve electrical connection by leading electric wirings for switching of the pixels to the outside of the display screen. When the number of pixels is 100,000, for example, the number of electrical connections required is 300. Therefore, the conventional practice is to fabricate a switching circuit at the periphery of the display screen to thereby reduce the number of electrical connections, i.e., to ten-odd connections. For the above-described reason, the substrate of the two-dimensional display device needs an area for electrical connection of the pixels with switching elements in addition to the area for display and requires a substrate larger in size than the display screen.

Thus, the half-mirror or beam splitter surface 4 must be disposed at a predetermined distance from the observer's eye 2 in order to prevent the substrate of the two-dimensional image display device 6 from interfering with the observer's head. Accordingly, when it is intended to widen the field angle for observation, the size of the half-mirror or beam splitter surface 4 increases, resulting in an increase in the overall size of the apparatus. In the case of a head-mounted image display apparatus such as that shown in FIG. 18, the increase of the size and weight is a principal factor in making the user feel uncomfortable when wearing the display apparatus, which is a serious problem.

SUMMARY OF THE INVENTION

In view of the above-described problems of the background art, it is an object of the present invention to provide a head-mounted image display apparatus which is designed so that the field angle for observation can be widened without causing the substrate of a two-dimensional image display device to interfere with the observer's head and without increasing the overall size of the apparatus.

To attain the above-described object, the present invention first provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis passing through the semitransparent reflecting surface goes to and returns from the magnifying reflecting mirror to form a turn-back optical path. In the image display apparatus, a straight line that connects an eye point and a position where the optical axis reflected by the magnifying reflecting mirror is reflected by the semitransparent reflecting surface is defined as a visual axis, and the semitransparent reflecting surface is disposed at a tilt to the image axis to change the angle of inclination of the semitransparent reflecting surface to the image axis so that the angle ($\phi$) made by intersection of the image axis extending from the image display device and the visual axis extending from the eye point is larger than 90° ($\phi>90°$).

Secondly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis passing through the semitransparent reflecting surface goes to and returns from the magnifying reflecting mirror to form a turn-back optical path. In the image display apparatus, a straight line that connects an eye point and a position where the optical axis reflected by the magnifying reflecting mirror is reflected by the semitransparent reflecting surface is defined as a visual axis, and the magnifying reflecting mirror is disposed at a tilt to the image axis so that the angle ($\phi$) made by intersection of the image axis extending from the image display device and the visual axis extending from the eye point is larger than 90° ($\phi>90°$).

Thirdly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis passing through the semitransparent reflecting surface goes to and returns from the magnifying reflecting mirror to form a turn-back optical path. In the image display apparatus, a straight line that connects an eye point and a position where the optical axis reflected by the magnifying reflecting mirror is reflected by the semitransparent reflecting surface is defined as a visual axis, and the magnifying reflecting mirror is shifted with respect to the image axis so that the angle ($\phi$) made by intersection of the image axis extending from the image display device and the visual axis extending from the eye point is larger than 90° ($\phi$>90°).

Fourthly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis reflected by the semitransparent reflecting surface goes to and returns from the magnifying reflecting mirror to form a turn-back optical path. In the image display apparatus, the semitransparent reflecting surface is a partially transmitting-reflecting surface composed of transmitting and reflecting regions which are locally distinguished from each other, and a straight line that connects an eye point and a position where the optical axis reflected by the magnifying reflecting mirror is transmitted by the partially transmitting-reflecting surface is defined as a visual axis. The partially transmitting-reflecting surface is disposed at a tilt to the image axis to change the angle of inclination of the partially transmitting-reflecting surface to the image axis so that the angle ($\phi$) made by intersection of the image axis extending from the image display device and the visual axis extending from the eye point is larger than 90° ($\phi$>90°).

Fifthly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis reflected by the semitransparent reflecting surface goes to and returns from the magnifying reflecting mirror to form a turn-back optical path. In the image display apparatus, the magnifying reflecting mirror is a partially transmitting-reflecting surface composed of transmitting and reflecting regions which are locally distinguished from each other, and a straight line that connects an eye point and a position where the optical axis reflected by the partially transmitting-reflecting surface is transmitted by the semitransparent reflecting surface is defined as a visual axis. The partially transmitting-reflecting surface is disposed at a tilt to the image axis so that the angle ($\phi$) made by intersection of the image axis extending from the image display device and the visual axis extending from the eye point is larger than 90° ($\phi$>90°).

Sixthly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis reflected by the semitransparent reflecting surface goes to and returns from the magnifying reflecting mirror to form a turn-back optical path. In the image display apparatus, a straight line that connects an eye point and a position where the optical axis reflected by the magnifying reflecting mirror is transmitted by the semitransparent reflecting surface is defined as a visual axis, and the magnifying reflecting mirror is shifted with respect to the image axis so that the angle ($\phi$) made by intersection of the image axis extending from the image display device and the visual axis extending from the eye point is larger than 90° ($\phi$>90°).

Seventhly, the present invention provides a face-mounted image display apparatus including a face-mounted unit which has an image display device with a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis leaving the semitransparent reflecting surface goes to and returns from the magnifying reflecting mirror to form a turn-back optical path, and a support member for retaining the face-mounted unit on the observer's head. In the image display apparatus, a straight line that connects an eye point and a position where the optical axis reflected by the magnifying reflecting mirror is tangent to the semitransparent reflecting surface is defined as a visual axis, and at least the semitransparent reflecting surface or the magnifying reflecting mirror is decentered so that the angle ($\phi$) made by intersection of the image axis extending from the image display device and the visual axis extending from the eye point is larger than 90° ($\phi$>90°).

Eighthly, the present invention provides a head-mounted image display apparatus having an image display device, a semitransparent reflecting mirror, and a magnifying reflecting mirror, in which the image display device is used as an object point of the magnifying reflecting mirror, and the object point is projected in the air as an enlarged image for the observer without effecting image formation in the optical path. In the image display apparatus, either or both the semitransparent reflecting mirror and the magnifying reflecting mirror are decentered so that the display center of the image display device can be shifted away from the observer's head with respect to a reference axis which perpendicularly intersects the observer's visual axis lying when he or she sees forward.

In the first to seventh image display apparatuses of the present invention, the semitransparent reflecting surface may be formed from a half-mirror or a prism.

It is preferable that the angle made between the line normal to the semitransparent reflecting surface and the image axis should be smaller than π/4.

When the semitransparent reflecting surface is formed from a half-mirror, the angle θ between the line normal to the half-mirror and the image axis preferably satisfies the following condition:

$$\pi/4-\omega/2 \leq \theta < \pi/4$$

where ω is a half of the vertical field angle.

When the semitransparent reflecting surface is formed from a prism beam splitter having a half-mirror surface, the angle θ between the line normal to the half-mirror surface and the image axis preferably satisfies the following condition:

π/4−φ'/2 ≦ θ < π/4 where ω'=sin⁻¹ (sinφ/n), ω is a half of the vertical field angle, and n is the refractive index of a medium constituting the prism.

In the fourth and fifth image display apparatuses, the partially transmitting-reflecting surface may be a surface formed by partially coating aluminum on a surface of an optical member having a refractive index (n) larger than 1 (n>1).

Ninthly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis reflected by the semitransparent reflecting surface goes to and returns from the magnifying reflecting mirror to form a turn-back optical path. In the image display apparatus, the semitransparent reflecting surface is formed from a semitransparent film coated on a surface of an optical member having a refractive index (n) larger than 1 (n>1), and a straight line that connects an eye point and a position where the optical axis reflected by the magnifying reflecting mirror is transmitted by the semitransparent reflecting surface is defined as a visual axis. The semitransparent reflecting surface is disposed at a tilt to the image axis to change the angle of inclination of the semitransparent reflecting surface to the image axis so that the angle (φ) made by intersection of the image axis extending from the image display device and the visual axis extending from the eye point is larger than 90° (φ>90°).

Tenthly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis reflected by the semitransparent reflecting surface goes to and returns from the magnifying reflecting mirror to form a turn-back optical path. In the image display apparatus, the magnifying reflecting mirror is a magnifying reflecting surface formed from a semitransparent film coated on a surface of an optical member having a refractive index (n) larger than 1 (n>1), and a straight line that connects an eye point and a position where the optical axis reflected by the magnifying reflecting surface is transmitted by the semitransparent reflecting surface is defined as a visual axis. The magnifying reflecting surface is disposed at a tilt to the image axis so that the angle (φ) made by intersection of the image axis extending from the image display device and the visual axis extending from the eye point is larger than 90° (φ>90°).

In the ninth and tenth image display apparatuses, the semitransparent film may be formed from a metallic thin film, a dielectric multilayer film, or a polarized beam splitter that distinguishes p-polarized light and s-polarized light by reflection and transmission, or transmission and reflection.

Eleventhly, the present invention provides an image display apparatus including an image display device having a screen for displaying an image, a semitransparent reflecting surface disposed at an angle of inclination to an optical axis which is determined by a bundle of rays emitted from the display screen, the optical axis being defined as an image axis, and a magnifying reflecting mirror disposed so that an optical axis reflected by the semitransparent reflecting surface goes to and returns from the magnifying reflecting mirror to form a turn-back optical path. In the image display apparatus, the magnifying reflecting mirror is a totally reflecting mirror, and a straight line that connects an eye point and a position where the optical axis reflected by the totally reflecting mirror is transmitted by the semitransparent reflecting surface is defined as a visual axis. The totally reflecting mirror is disposed at a tilt to the image axis so that the angle (φ) made by intersection of the image axis extending from the image display device and the visual axis extending from the eye point is larger than 90° (φ>90°).

In the first to eleventh image display apparatuses of the present invention, either or both the optical path splitting device and the concave ocular mirror are decentered with respect to a reference axis perpendicularly intersecting the observer's visual axis lying when he or she sees forward. Accordingly, the display center of the two-dimensional display device can be shifted away from the observer's head, so that the two-dimensional display device will not interfere with the observer's head. It is therefore possible to widen the field angle for observation without increasing the overall size of the apparatus.

In addition, when the angle made between the line normal to the half-mirror or half-mirror surface and the optical axis of the image display device is set so as to be smaller than π/4, it is possible to reduce the area of the half-mirror or the volume of the prism beam splitter. In addition, the distance between the projection optical system and the image display device shortens, so that the diopter adjustable range enlarges. Further, the distance (working distance) between the projection optical system and the observer's eye lengthens. Accordingly, the user can observe a displayed image with his/her spectacles on.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some examples of the head-mounted image display apparatus according to the present invention will be described below with reference to the accompanying drawings.

The basic principle of the head-mounted image display apparatus according to the present invention is that either or both an optical path splitting device and a concave ocular mirror are decentered so that the display center of a two-dimensional image display device shifts away from the observer's head, thereby eliminating the possibility of the two-dimensional image display device interfering with the observer's head.

Figure 1:
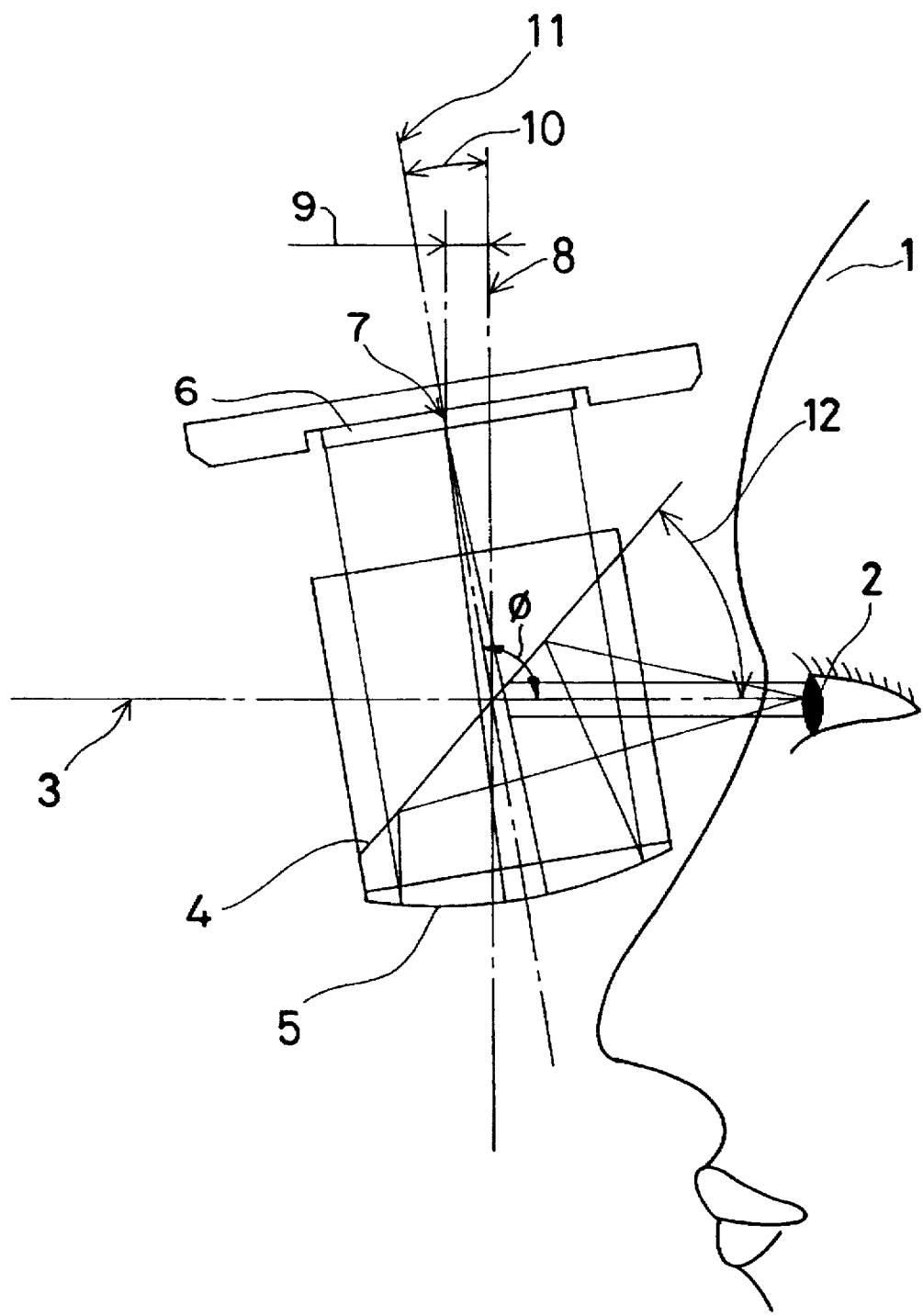
FIG. 1 is a sectional view showing a head-mounted image display apparatus according to Example 1 of the present invention.

Example 1 of the present invention will be explained below with reference to the sectional view of FIG. 1. The head-mounted image display apparatus of the present invention has an arrangement substantially similar to that of the above-described conventional image display apparatus. That is, a beam splitter surface 4 as an optical path splitting device is disposed in front of an eyeball position 2 of an observer 1 so as to diagonally intersect the observer's visual axis 3. In addition, a concave ocular mirror 5 is disposed below the beam splitter surface 4, and a two-dimensional image display device 6 is disposed to face the concave ocular mirror 5 across the beam splitter surface 4. Light from the two-dimensional image display device 6 passes through the beam splitter surface 4 and is reflected by the concave ocular mirror 5 and then reflected by the beam splitter surface 4 to reach the eyeball position 2, which is coincident with the eye point of this image display apparatus. Accordingly, a virtual image of the image displayed on the two-dimensional image display device 6 is formed in the air by the action of the concave ocular mirror 5. Thus, the observer can view the displayed image. In this case, the image that is displayed on the screen of the two-dimensional image display device 6 is projected in the air without undergoing image formation in the course of the propagation through the optical path. The eye point 2 is approximately coincident with a Fourier transform plane of light from the screen of the two-dimensional image display device 6. It should be noted that an outside world image can be observed directly through the beam splitter surface 4.

In this example, when an optical axis which is determined by a bundle of rays emitted from the screen of the two-dimensional image display device 6 is defined as an image axis x, the image axis x coincides with an optical axis 11 of the concave ocular mirror 5 which passes through the display center 7 of the two-dimensional image display device 6. The optical axis 11 is shifted through about 10° from a reference axis 8 which perpendicularly intersects the visual axis 3 and which passes through the point of intersection of the beam splitter surface 4 and the visual axis 3 so that the angle made by intersection of the image axis x and the visual axis 3 is larger than 90°, thereby ensuring the spacing between the observer 1 and the two-dimensional image display device 6. The shift angle Θ will hereinafter be referred to as "tilt angle 10" and defined as the angle made between the optical axis 11 of the concave ocular mirror 5 and the reference axis 8. It should be noted that in FIG. 1 the amount of shift of the display center 7 of the two-dimensional image display device 6 from the reference axis 8 is denoted by reference numeral 9. Thus, since both the two-dimensional image display device 6 and the concave ocular mirror 5 are tilted in comparison to those in the prior art, the angle 12 of inclination of the beam splitter surface 4 with respect to the visual axis 3 is larger than 45°, which is the original angle of inclination. That is, the beam splitter surface 4 is tilted, and the angle 12 becomes 45°+Θ/2.

In this example, it is important that the tilt angle Θ should be selected in the range of 0°<Θ<30°. If the tilt angle Θ is not larger than the lower limit of the above range, i.e., 0°, the two-dimensional image display device 6 cannot be disposed sufficiently away from the observer's head. If the tilt angle Θ is not smaller than the upper limit of the above range, i.e., 30°, the concave ocular mirror 5 comes closer to the observer's head (cheek) and may interfere with it.

The feature of this example resides in that since the concave ocular mirror 5 is not decentered with respect to the two-dimensional image display device 6, no large aberration is produced by the concave ocular mirror 5 and hence high resolution can be obtained.

Figure 2:
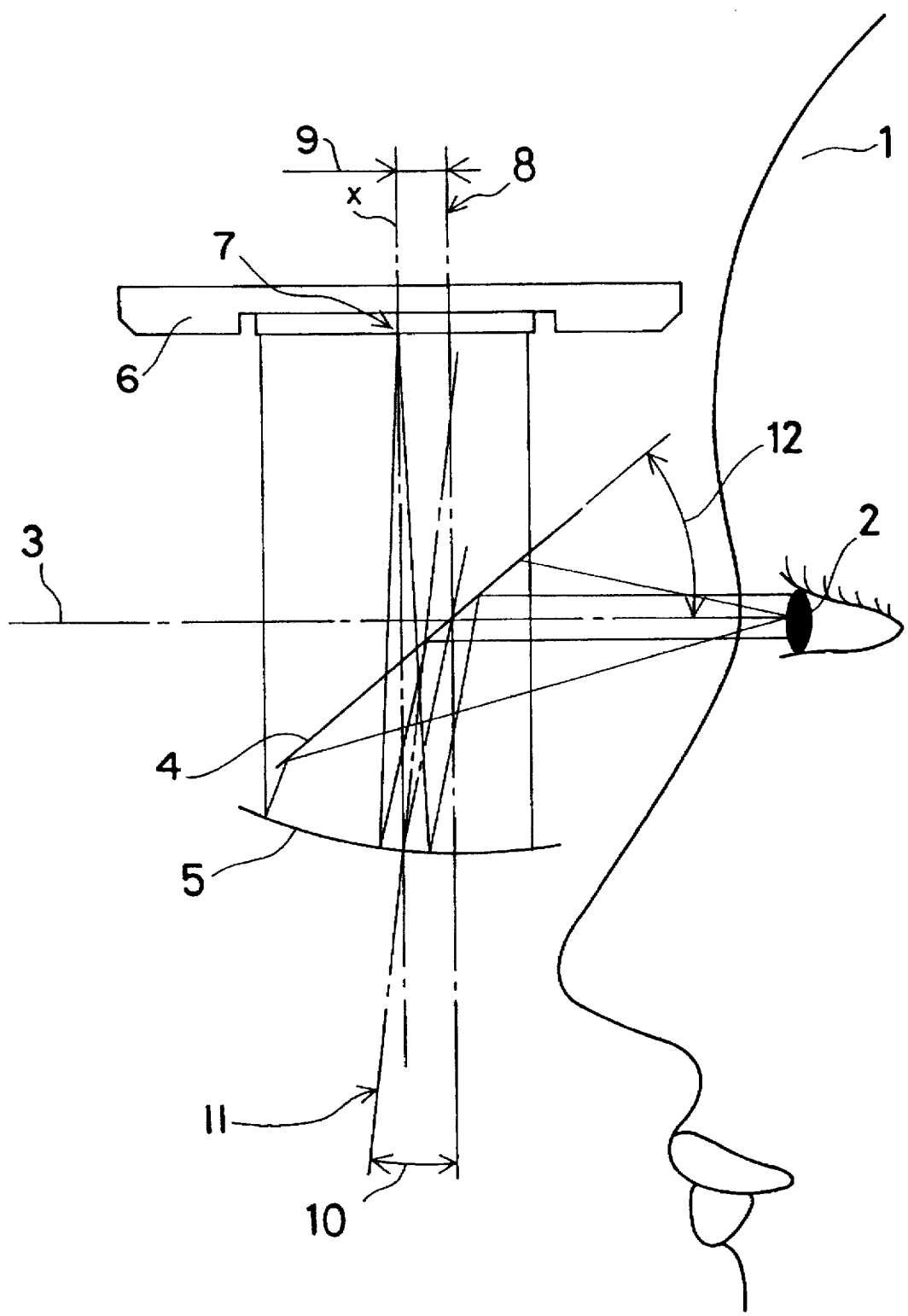
FIG. 2 is a sectional view showing a head-mounted image display apparatus according to Example 2 of the present invention.

Next, Example 2 of the present invention will be explained with reference to FIG. 2. In this example, a half-mirror 4 is used in place of the beam splitter. The feature of this example resides in that the half-mirror 4 is tilted at an angle Θ in the clockwise direction as viewed in the figure, and the concave ocular mirror 5 is parallel-displaced away from the observer's eyeball position 2 by an amount corresponding to the amount of shift 9 of the display center 7, and that the optical axis 11 is tilted at an angle Θ with respect to the reference axis 8. With this arrangement, the two-dimensional image display device 6 can be disposed sufficiently away from the observer's head so that it will not interfere with the observer's head.

In this example, the angle 12 of inclination of the half-mirror reflecting surface 4 is 45°−Θ/2. It is important that the tilt angle Θ should be selected in the range of 0°<Θ<30°. If the tilt angle Θ is not smaller than the upper limit of the above range, i.e., 30°, the amount of shift 9 of the display center 7 becomes 0. Consequently, the two-dimensional image display device 6 cannot effectively be separated away from the observer's head. If the tilt angle Θ is not larger than the lower limit of the above range, the bundle of rays from the two-dimensional image display device 6 is incident on the concave ocular mirror 5 at an excessively large angle to the optical axis 11 of the concave ocular mirror 5, causing large comatic aberration to be produced. Thus, it becomes impossible to obtain a wide field angle and high resolution.

It is even more preferable to tilt the two-dimensional image display device 6 at an angle equal to the angle Θ in the clockwise direction as viewed in the figure so that the two-dimensional image display device 6 perpendicularly intersects the optical axis 11 of the concave ocular mirror 5 for the purpose of correcting the bowing of the aerial image which is caused by inclining the concave ocular mirror 5 with respect to the optical axis and which is seen to the observer 1 as a diopter error of the observation image. By doing so, the above-described diopter error can be eliminated.

Figure 3:
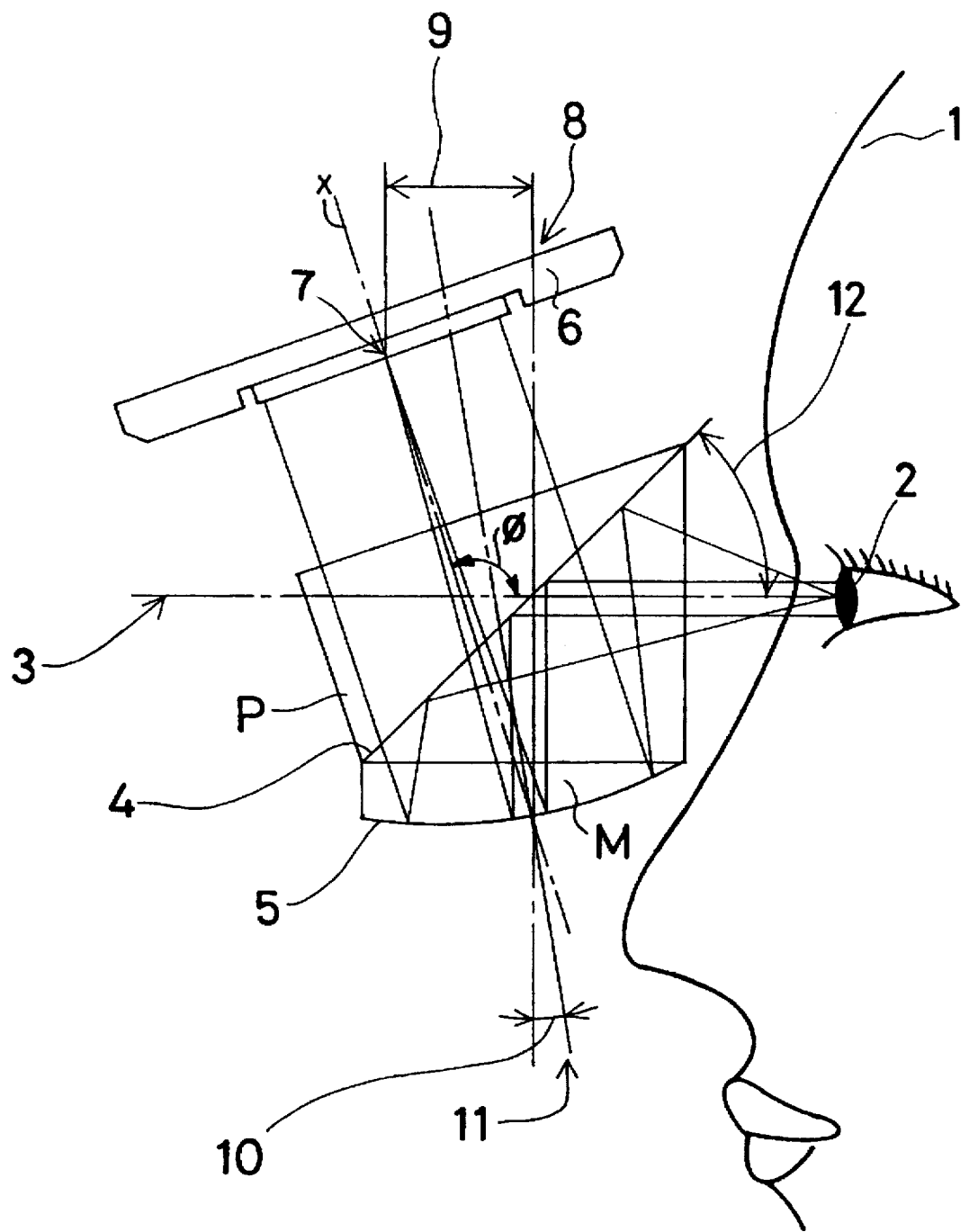
FIG. 3 is a sectional view showing a head-mounted image display apparatus according to Example 3 of the present invention.

Next, Example 3 of the present invention will be explained with reference to FIG. 3. This example is basically the same as Example 1. In this example, however, the optical axis 11 of the concave ocular mirror 5 is tilted with respect to the image axis x. In addition, a beam splitter prism P is used as an optical path splitting device, and a reverse reflecting mirror M is used as a concave ocular mirror 5. In this example, the beam splitter surface 4 is inclined at an angle of 45°, as denoted by reference numeral 12, and need not be further inclined in particular. It is important that the tilt angle Θ of the optical axis 11 of the concave ocular mirror 5 with respect to the reference axis 8 should be selected in the range of 0°<Θ<30°. If the tilt angle Θ is not smaller than the upper limit of the above range, i.e., 30°, the bundle of rays from the two-dimensional image display device 6 is incident on the concave ocular mirror 5 at an excessively large angle to the optical axis 11 of the concave ocular mirror 5, causing large comatic aberration to be produced by the concave ocular mirror 5. Accordingly, it becomes impossible to obtain a wide field angle and high resolution. If the tilt angle Θ is not larger than the lower limit of the above range, the amount of shift 9 of the display center 7 becomes 0. Consequently, the two-dimensional image display device 6 cannot effectively be separated away from the observer's head.

It is even more preferable to incline the line normal to the two-dimensional image display device 6 at an angle equal to the angle Θ toward the reference axis 8 for the purpose of correcting the bowing of the aerial image which is caused by inclining the concave ocular mirror 5 with respect to the optical axis and which is seen to the observer 1 as a diopter error of the observation image. By doing so, the above-described diopter error can be eliminated.

Figure 4:
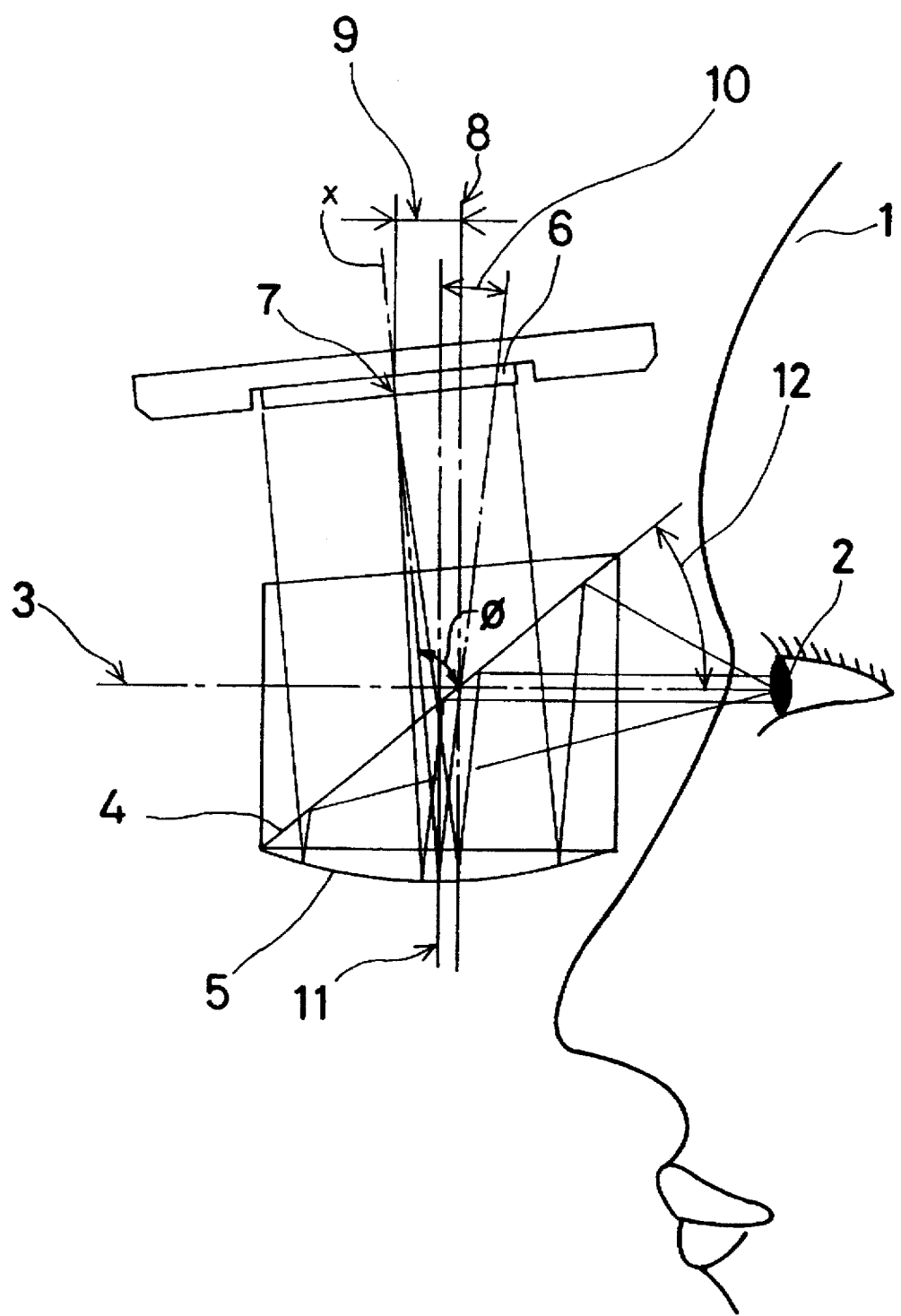
FIG. 4 is a sectional view showing a head-mounted image display apparatus according to Example 4 of the present invention.

Next, Example 4 of the present invention will be explained with reference to FIG. 4. This example is basically the same as Example 2. The feature of this example resides in that the concave ocular mirror 5 is not tilted with respect to the axial ray on the visual axis 3 but disposed so that the optical axis thereof is parallel to the reference axis 8. In this case, if the tilt angle Θ is defined as the angle made between the optical axis 11 of the concave ocular mirror 5 and the axial ray reflected by the concave ocular mirror 5, the condition therefor is the same as in Example 2. In this example, the angle 12 of inclination of the beam splitter surface 4 with respect to the visual axis 3 is 45°−Θ/2.

The foregoing discussion centers about the tilt angle Θ from the reference axis 8, which perpendicularly intersects the visual axis 3 and which passes through the point of intersection of the beam splitter surface 4 and the visual axis 3. The following is another discussion which centers about the angle θ made between the image axis x of the two-dimensional image display device 6 [hereinafter referred to as "LCD (Liquid Crystal Display)] and the line normal to the half-mirror 4.

Figure 5:
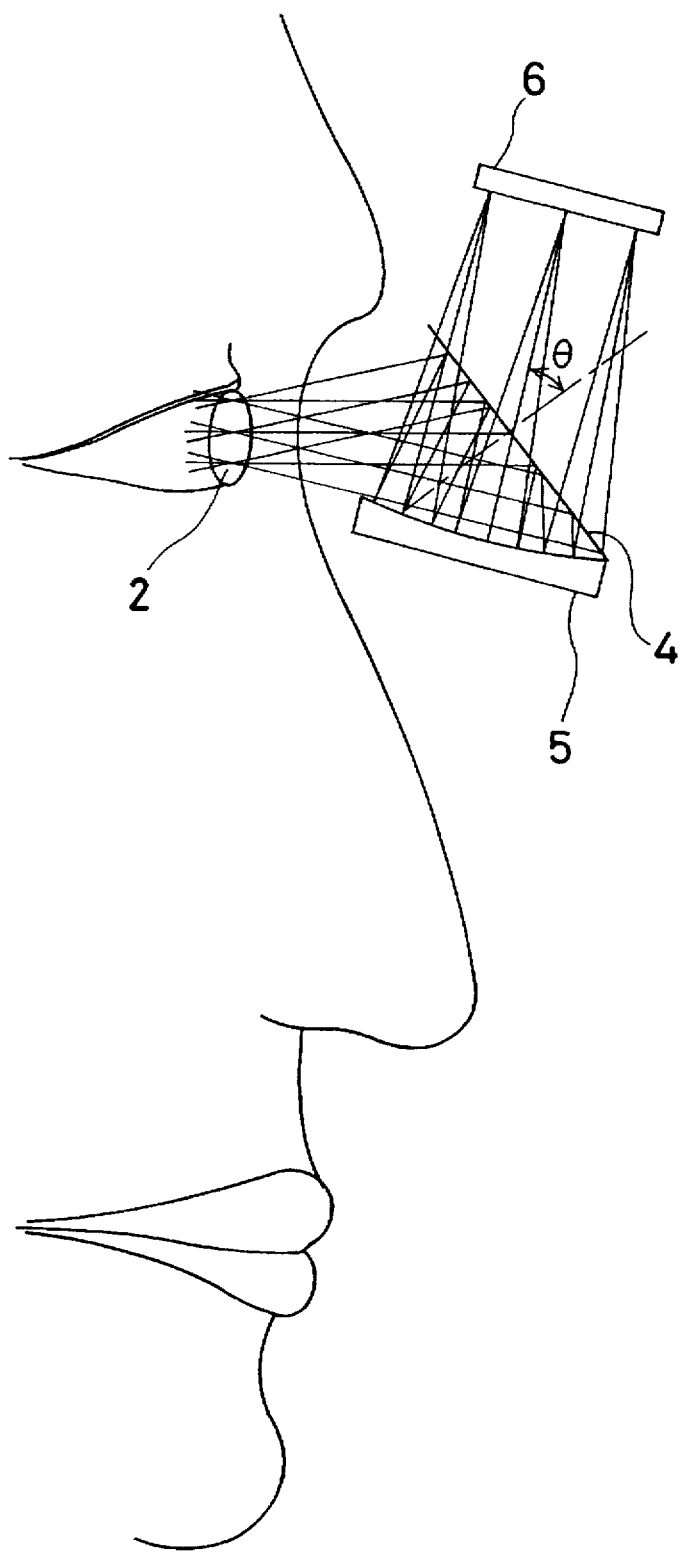
FIG. 5 shows a basic form of the image display apparatus according to the present invention for discussion from another point of view.

FIG. 5 shows a basic form of the image display apparatus according to the present invention which includes an LCD 6 for displaying an image, a half-mirror 4 which is obliquely disposed at the point of intersection of the optical axis (image axis) of the LCD 6 and the observer's visual axis for leading a bundle of rays from an image formed by the LCD 6 to an observer's eyeball (eye point) 2, and a magnifying reflecting mirror 5 of positive power which is disposed to face the LCD 6 across the half-mirror 4. The half-mirror 4 is disposed so that the angle e made between the line normal to the half-mirror 4 and the optical axis of the LCD 6 is smaller than π/4.

Figure 6:
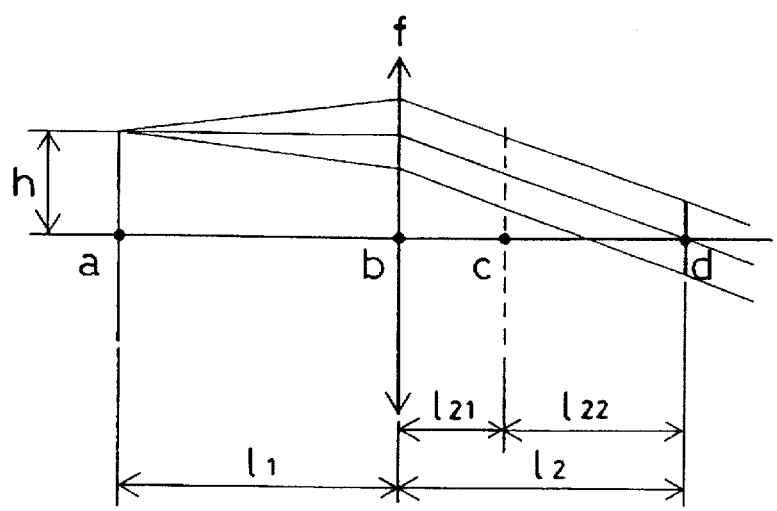
FIG. 6 is a developed view of a basic optical system for the arrangement shown in FIG. 5.

FIG. 6 is a developed view of a basic optical system of the arrangement shown in FIG. 5. An image displayed on an LCD a is projected as an enlarged image on an eyeball located at an eye point d by the action of an optical element b having positive power. A half-mirror c is disposed between the optical element b and the eye point d.

The focal length f of the optical element b is determined by the size of an image displayed by the LCD a and the field angle of an image presented for observation.

When the optical element b having refractive power is a single concave mirror, the distance $l_1$ between the LCD a and the concave mirror b and the distance $l_2$ between the concave mirror b and the eye point b are uniquely determined. Factors that have a degree of freedom in the arrangement of the optical system are the distance $l_{21}$ between the concave mirror b and the half-mirror c and the angle made between the optical axis of the LCD a and the line normal to the half-mirror c. In the present invention, the following problems ① to ② can be solved by optimization of the angle of the half-mirror c:

① As the size of the projection optical system increases, the load that is imposed on the user when wearing the image display apparatus on his/her head or face increases.

② The diopter of the image for observation can be adjusted by moving the LCD along the optical axis. However, when the distance between the projection optical system and the LCD shortens, the half-mirror or the prism beam splitter may interfere with the LCD when the LCD is moved toward the magnifying reflecting mirror. Therefore, the diopter adjustable range narrows.

③ When the distance (working distance: WD) between the projection optical system and the observer's eyeball shortens, it becomes impossible for the observer to view with his/her spectacles on, and each time users change from one to another, the diopter must be adjusted to a considerable extent. Further, when WD is short, there may be an interference between the projection optical system and the LCD on the one hand and the observer's face on the other.

Figure 7:
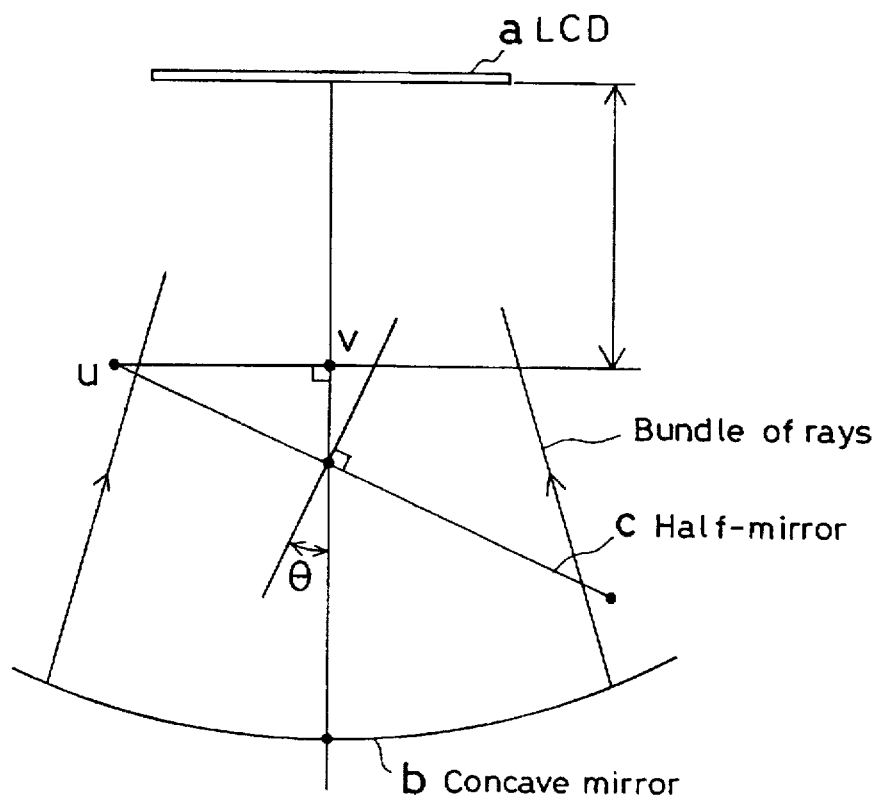
FIG. 7 shows a half-mirror disposed with respect to a bundle of rays reflected by a concave mirror.
Figure 8:
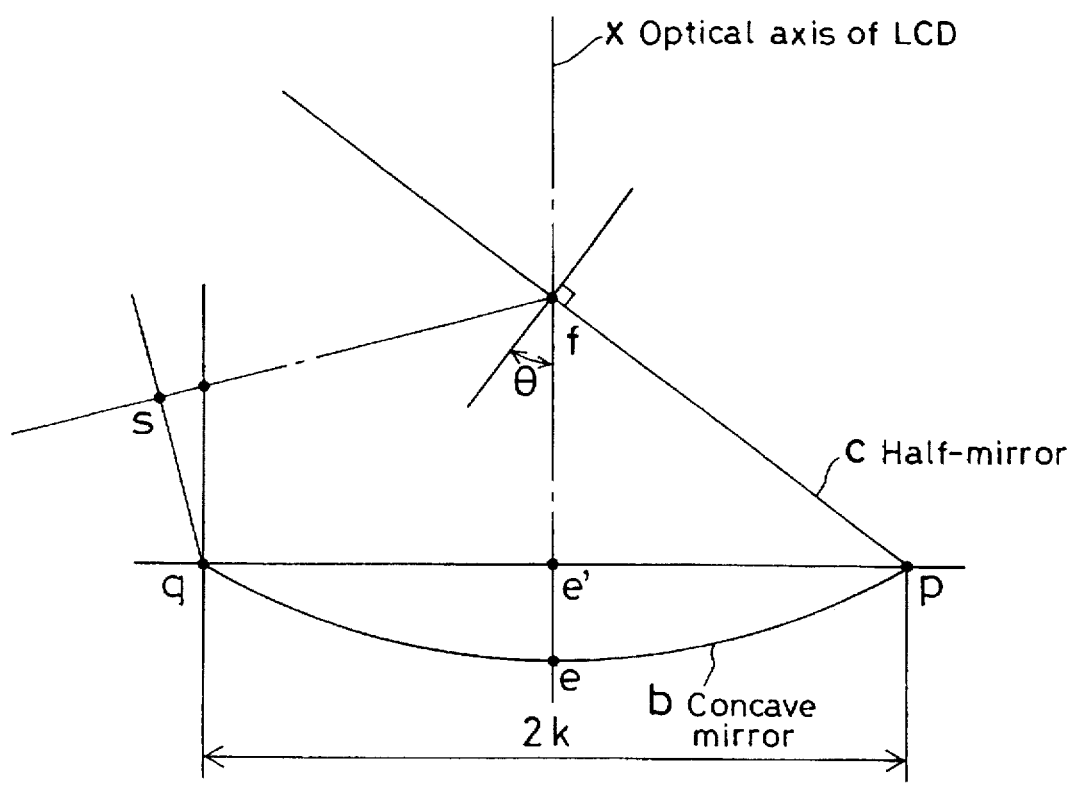
FIG. 8 is a sectional view of the optical system shown in FIG. 6, taken along a plane containing the optical axis of an LCD and the center of an observer's eye.

Improvements achieved by optimization of the angle of the half-mirror c will be explained below from the viewpoint of the size of the projection optical system, the distance between the projection optical system and the LCD, and the distance between the projection optical system and the observer's eyeball with reference to FIGS. 7 to 9.

First, the size of the projection optical system will be explained. FIG. 7 shows the half-mirror c that is disposed relative to a bundle of rays reflected by the concave mirror b. With regard to the area of the half-mirror c, minimization of it enables a reduction in the overall size and weight of the projection optical system. The size of the half-mirror c must be larger than at least the cross-section of the bundle of rays reflected by the concave mirror b, which is taken along the plane in which the half-mirror c is disposed. In other words, the smaller the angle θ made between the line normal to the half-mirror c and the optical axis of the LCD a, the smaller the size of the half-mirror c.

Let us consider the size of a prism beam splitter when used to constitute the half-mirror c. If the point of intersection of a line perpendicular to the optical axis of the LCD a from the end surface u of the half-mirror c which is closer to the LCD a and the optical axis of the LCD a is assumed to be v, as the angle θ between the line normal to the half-mirror c and the optical axis of the LCD a becomes smaller, the angle of inclination of the half-mirror c decreases, and the distance between the concave mirror b and the point v shortens. The advantageous effect is particularly significant when the half-mirror c is formed by using a prism beam splitter; the shorter the distance between the concave mirror b and the point v, the smaller the volume of the prism.

Next, the distance between the projection optical system and the LCD will be explained. If the point of intersection of a line perpendicular to the optical axis of the LCD a from the end surface u of the half-mirror c which is closer to the LCD a and the optical axis of the LCD a is assumed to be v, as the angle θ between the line normal to the half-mirror c and the optical axis of the LCD a becomes smaller, the distance between the concave mirror b and the point v shortens, so that the distance between the LCD a and the prism can be increased correspondingly. Accordingly, when the diopter is adjusted by moving the LCD a, the diopter adjustable range enlarges.

Next, the distance between the projection optical system and the observer's eyeball will be explained. FIG. 8 is a sectional view of the optical system taken along the plane that contains the optical axis x of the LCD and the center of the observer's eyeball. It is assumed that the point of intersection of the optical axis x of the LCD and the concave mirror b is e; the point of intersection of the half-mirror c and the concave mirror b in the plane that contains both the optical axis x of the LCD and the line normal to the half-mirror c when the half-mirror c is disposed so that the curved line where the concave mirror b and the half-mirror c intersect each other will not eclipse the bundle of rays is p; the point of intersection of the optical axis x of the LCD and the half-mirror c is f; the angle made between the optical axis x of the LCD and the line normal to the half-mirror c is θ; a point on the concave mirror b which is in symmetry with the point p with respect to the optical axis x of the LCD is q; and the point of intersection of an optical axis (visual axis) formed by reflection of the reflected rays from the concave mirror b by the half-mirror c and a line perpendicular to the optical axis from the point q is s. The distance WD is given by $$WD = l_2 - (ef + fs) \quad (1)$$

where ef is the distance between the concave mirror b and the half-mirror c, and fs is the distance between the half-mirror c and the point s.

Therefore, the distance WD reaches a maximum when (ef+fs) is minimized.

When the point p of intersection of the concave mirror b and the half-mirror c is fixed, (ef+fs) is a function of only the angle θ, which may be given by $$g(\theta) = ef + fs \quad (2)$$

It is assumed that the distance between the points p and q is 2k, and the point of intersection of the optical axis x of the LCD and a mutual line perpendicular to the optical axis x from the points p and q is e'.

When the curvature of the concave mirror b and the point p are fixed, the distance between the points e and e' is a constant. Assuming that the distance is t, g(θ) is given by $$g(\theta) = k(\tan\theta + 1/\sin 2\theta + \tan\theta \cos 2\theta - \cos 2\theta/\tan 2\theta) + t \quad (3)$$

Figure 9:
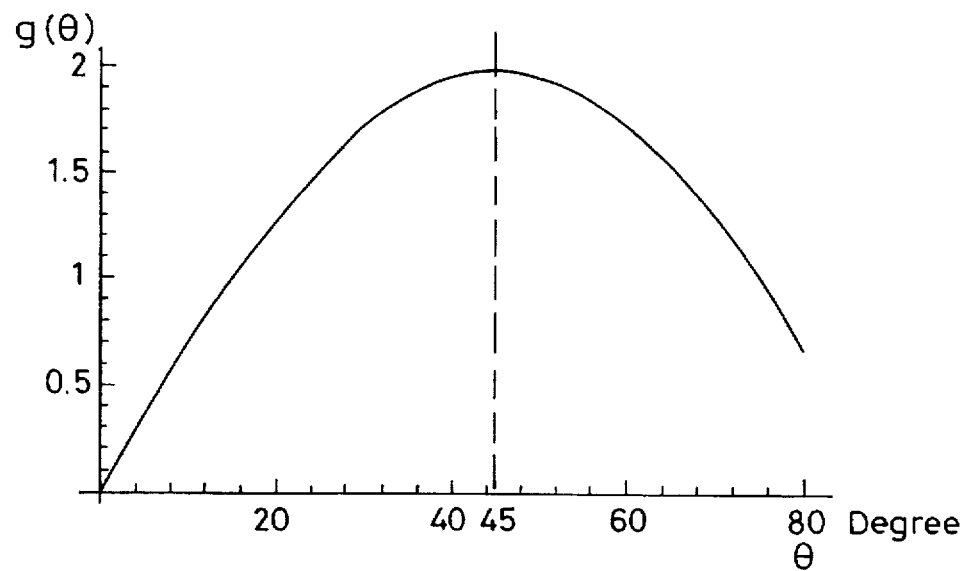
FIG. 9 is a graph showing the relationship between g(θ) and θ.

FIG. 9 is a graph showing the relationship between g(θ) and θ. When θ=π/4 (45°), g(θ) reaches a maximum. When θ<π/4, g(θ) monotonously increases, whereas, when θ>π/4, g(θ) monotonously decreases. However, when θ>π/4, the LCD a comes closer to the observer's face, which is undesirable.

Accordingly, it is possible to increase the distance WD by reducing the angle θ made between the optical axis x of the LCD and the line normal to the half-mirror c.

Thus, as the angle of the half-mirror c becomes smaller than π/4, the size of the projection optical system can be minimized, and it is possible to lengthen the distance WD between the observer's eyeball and the projection optical system and the distance between the LCD and the projection optical system.

However, if the angle of the line normal to the half-mirror c with respect to the optical axis x of the LCD is made excessively smaller than π/4, among light rays emitted from the LCD a and reflected from the concave mirror b and the half-mirror c, the ray that enters the observer's ball from the lowermost side perpendicularly intersects the optical axis x of the LCD. If the angle of the line normal to the half-mirror c with respect to the optical axis x of the LCD is made further small, the edge of the concave mirror b which is opposite to the intersection of the half-mirror c and the concave mirror b with respect to the optical axis x of the LCD eclipses light rays which are reflected from the half-mirror c toward the observer's eyeball.

More specifically, assuming that the vertical field angle is 2ω, and the refractive index of a medium constituting a prism used to constitute the half-mirror c is n, the angle θ made between the optical axis x of the LCD and the line normal to the half-mirror c is preferably set in the following range:

$$\pi/4 - \phi'/2 \leq \theta < \pi/4 \quad (4)$$

where $$\omega' = \sin^{-1}(\sin\phi/n) \quad (5)$$

When air is used as a medium constituting the prism (in a case where it is used to constitute the half-mirror c), the expression (4) is as follows:

$$\pi/4 - \omega/2 \leq \theta < \pi/4 \quad (6)$$

In the expression (4) or (6), as the value for θ approaches the left-hand side, the above-described effect becomes greater.

When a surface of positive power is interposed between the observer's eyeball and the half-mirror c for the purpose of reducing the overall size of the optical system, the optimal value is slightly larger than the left-hand side of the expression (4) or (6).

Next, some examples of the image display apparatus according to the present invention, which are based on the above discussion, will be explained in comparison to the prior art.

Figure 10:
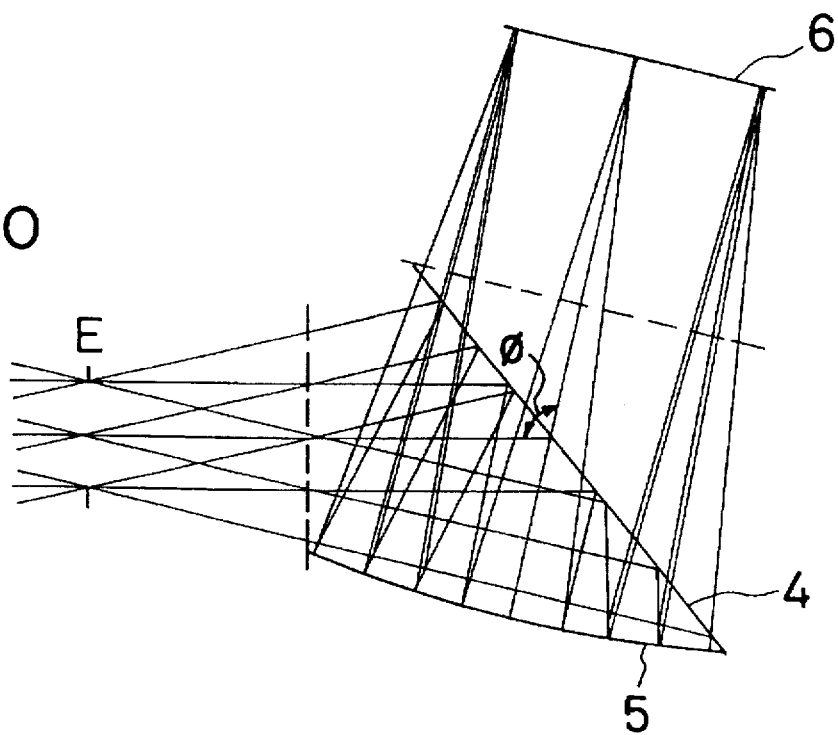
FIGS. 10(a) and (b) are sectional views respectfully showing an optical system of Example 5, and an optical system of prior art 1 corresponding to it.
Figure 10:
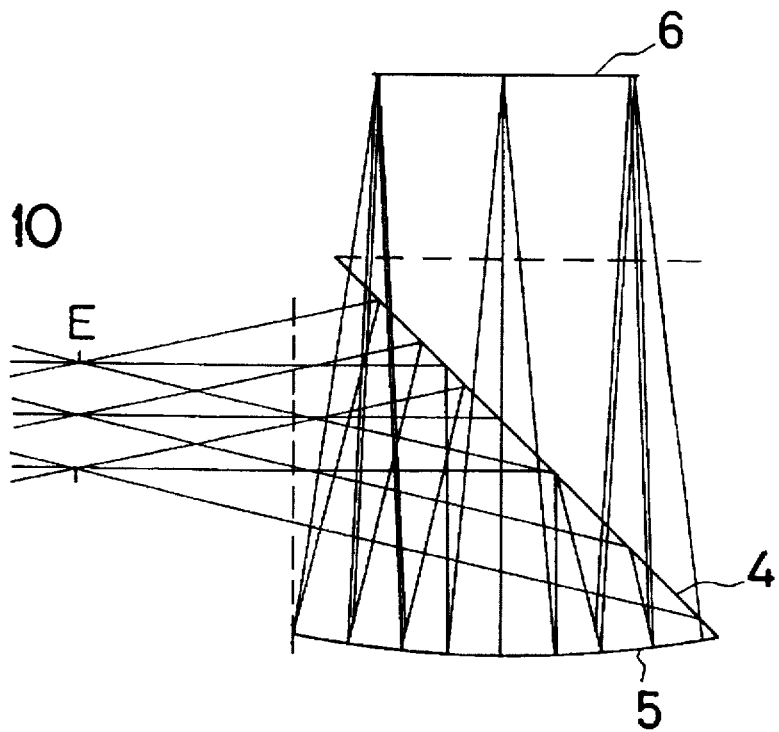

Referring to FIG. 10, (a) is a sectional view of an optical system of Example 5 according to the present invention, and (b) is a sectional view of an optical system of prior art 1 corresponding to Example 5. In the figure, reference symbol E denotes the position of an observer's pupil, 6 an LCD, 4 a half-mirror, and 5 a concave mirror. The angle made between the optical axis of the LCD 6 and the line normal to the half-mirror 4 is 38.5° in Example 5; it is 45° in prior art 1. Numerical data in Example 5 and prior art 1 will be described later. Example 5 and prior art 1 are equal to each other in terms of the field angle, which is 35×26°, the size of the LCD 6, which is 26.0×19.1 mm, the distance from the LCD 6 to the concave mirror 5, and the distance from the concave mirror 5 to the pupil position E.

In this example, since the angle made between the optical axis of the LCD 6 and the line normal to the half-mirror 4 is set at 38.5°, the distance from the end surface of the optical system to the observer's eyeball can be increased to 17.5 mm from 16.5 mm in the prior art, and the distance from the end surface of the half-mirror 4 to the LCD 6 can be increased to 19 mm from 14 mm in the prior art. In addition, the area of the half-mirror 4 can be reduced by 7.5% in comparison to the prior art.

Figure 11:
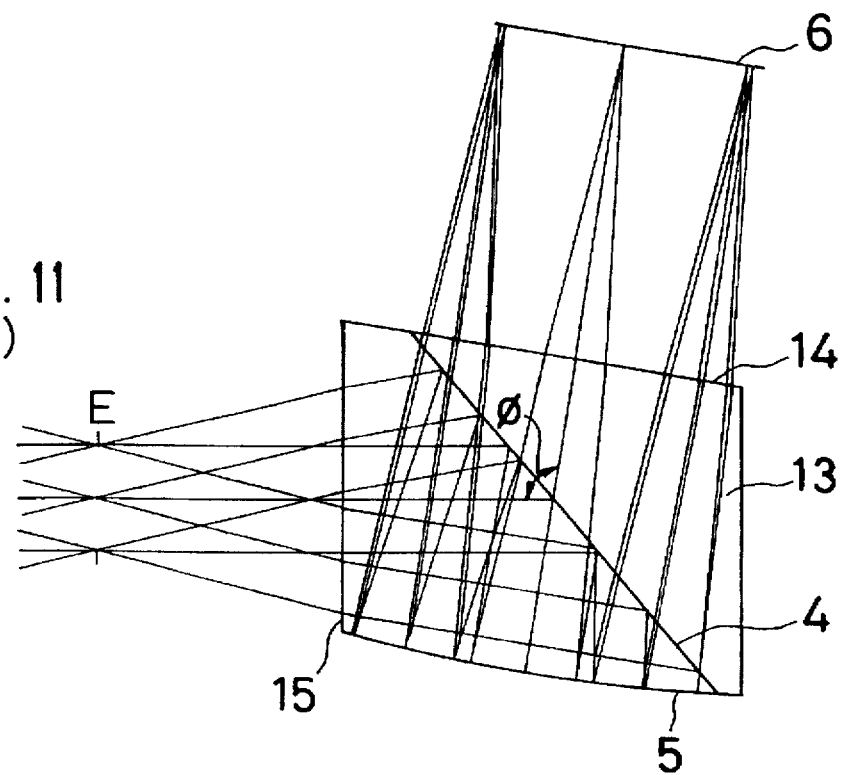
FIGS. 11(a) and (b) are sectional views respectfully showing an optical system of Example 6, and an optical system of prior art 2 corresponding to it.
Figure 11:
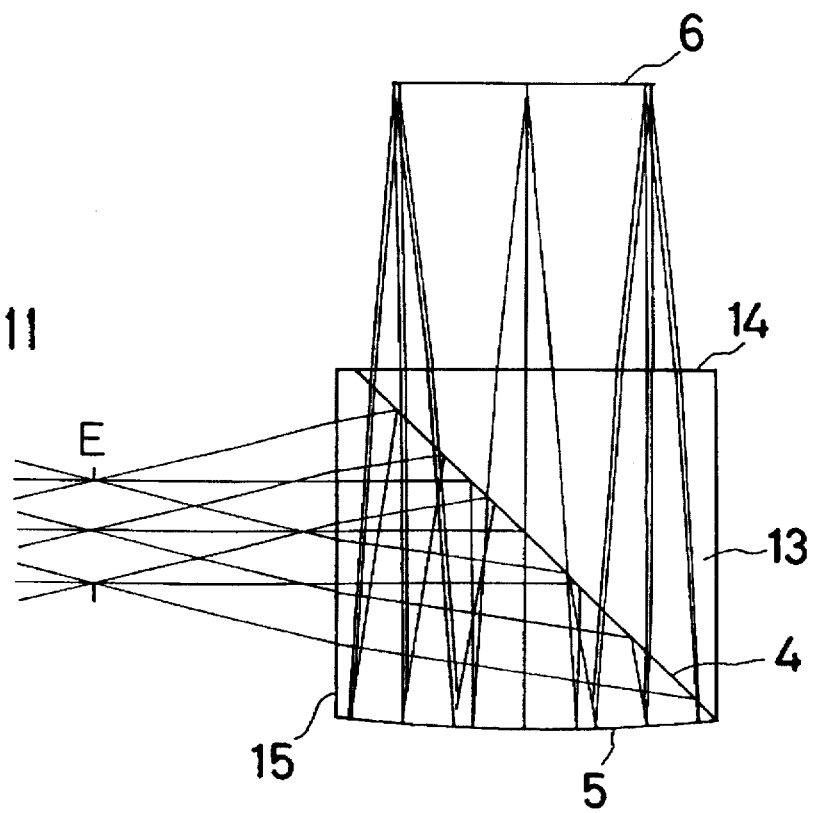

Referring to FIG. 11, (a) is a sectional view of an optical system of Example 6 according to the present invention, and (b) is a sectional view of an optical system of prior art 2 corresponding to Example 6. In the figure, reference symbol E denotes the position of an observer's pupil, 6 an LCD, 13 a prism beam splitter, 4 a half-mirror surface of the prism beam splitter 13, 5 a concave mirror, 14 a surface of the prism beam splitter 13 which faces the LCD 6, and 15 a surface of the prism beam splitter 13 which faces the observer's eyeball. The angle made between the optical axis of the LCD 6 and the line normal to the half-mirror 4 is 40.5° in Example 6; it is 45° in prior art 2. Numerical data in Example 6 and prior art 2 will be described later. Example 6 and prior art 2 are equal to each other in terms of the field angle, which is 37×27.6°, and the size of the LCD 6, which is 26.0×19.1 mm.

In this example, since a prism beam splitter is used as a half-mirror, divergence of the bundle of rays can be minimized, and the field angle can be widened. Further, since the angle made between the optical axis of the LCD 6 and the line normal to the half-mirror 4 is set at 40.5°, the distance from the prism end surface 15 to the observer's eyeball can be increased to 19.2 mm from 19.0 mm in the prior art, and the distance from the prism end surface 14 to the LCD 6 can be increased to 24.9 mm from 22.5 mm in the prior art. In addition, the volume of the prism can be reduced by 12% in comparison to the prior art.

Figure 12:
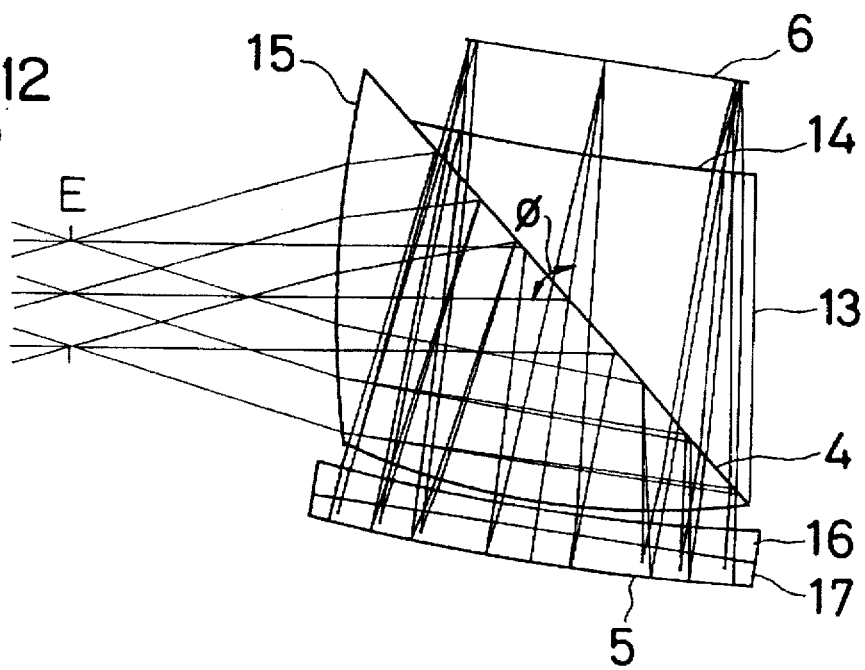
FIGS. 12(a) and (b) are sectional views respectively showing an optical system of Example 7, and an optical system of prior art 3 corresponding to it.
Figure 12:
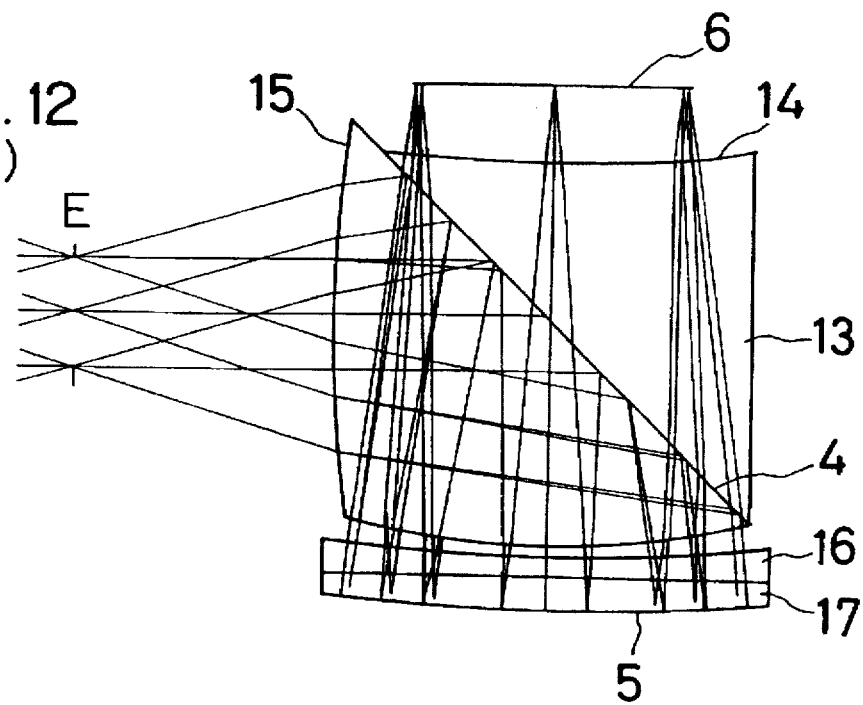

Referring to FIG. 12, (a) is a sectional view of an optical system of Example 7 according to the present invention, and (b) is a sectional view of an optical system of prior art 3 corresponding to Example 7. In the figure, reference symbol E denotes the position of an observer's pupil, 6 an LCD, 13 a prism beam splitter, 4 a half-mirror surface of the prism beam splitter 13, 5 a concave mirror, 14 a surface of the prism beam splitter 13 which faces the LCD 6, 15 a surface of the prism beam splitter 13 which faces the observer's eyeball, 16 a concave lens, and 17 a convex lens. The angle made between the optical axis of the LCD 6 and the line normal to the half-mirror 4 is 41° in Example 7; it is 45° in prior art 3. Numerical data in Example 7 and prior art 3 will be described later. Example 7 and prior art 3 are equal to each other in terms of the field angle, which is 44×33.2°, and the size of the LCD 6, which is 26.0×19.1 mm.

In Example 6, divergence of the bundle of rays in the prism is minimized by imparting positive power to the eyeball-side surface 15 of the prism in this example, thereby further widening the field angle. In the prior art, the distance from the LCD 6 to the prism is short, so that the diopter adjustable range is narrow when diopter correction is made in the negative direction (the image position is moved toward the near side) by moving the LCD 6. In this example, however, since the angle made between the optical axis of the LCD 6 and the line normal to the half-mirror surface 4 is set at 41°, the distance from the vertex of the prism end surface 14 to the LCD 6 can be increased to 7.00 mm from 5.55 mm in the prior art. Thus, the diopter adjustable range can be enlarged by 1.3/m to the negative side in comparison to the prior art. Further, the distance from the prism end surface 15 to the observer's eyeball can be increased to 20.0 mm from 19.3 mm in the prior art. In addition, the volume of the prism can be reduced by 10% in comparison to the prior art.

Numerical data in the above-described Examples 5 to 7 and prior arts 1 to 3, which are obtained by backward tracing, will be shown below. These pieces of data are all shown in the order of backward tracing from the pupil E to the image display device 6. In all Examples, $r_0$ denotes the pupil E, $d_0$ is the working distance (WD), $r_1, r_2 \ldots$ are the radii of curvature of lens surfaces or reflecting surfaces, $d_1, d_2 \ldots$ are the spacings between adjacent lens surfaces, $n_{d1}, n_{d2} \ldots$ are the refractive indices for the spectral d-line of the glass materials, $v_{d1}, v_{d2} \ldots$ are the Abbe's numbers of the glass materials, and $r_{20}$ is the image display device 6. Further, the aspherical configuration is expressed by $$z=ch^2/\{1+[1-c^2(K+1)h^2]^{1/2}\}+Ah^4+Bh^6+Ch^8+Dh^{10} \quad (7)$$

where z: deviation from a plane tangent to a lens at the optical axis (sag value)

c: paraxial curvature h: distance from the optical axis

K: conical constant

A: 4th-order aspherical coefficient

B: 6th-order aspherical coefficient

C: 8th-order aspherical coefficient

D: 10th-order aspherical coefficient

Example 5

| | |
|---|---|
| $r_0 = \infty$ | (E) $d_0 = 35.300000$ |
| $r_1 = \infty$ | (4) $d_1 = -14.172190$ |
| | ($\theta = 38.500000°$) |
| $r_2 = 85.48059$ | (5) $d_2 = 43.835912$ |
| $r_{20} = \infty$ | (6) |

Prior art 1

| | |
|---|---|
| $r_0 = \infty$ | (E) $d_0 = 32.000000$ |
| $r_1 = \infty$ | (4) $d_1 = -17.472190$ |
| | ($\theta = 45.000000°$) |
| $r_2 = 85.48059$ | (5) $d_2 = 43.835912$ |
| $r_{20} = \infty$ | (6) |

Example 6

| | | | |
|---|---|---|---|
| $r_0 = \infty$ | (E) | $d_0 = 19.200000$ | |
| $r_1 = \infty$ | (15) | $d_1 = 16.200000$ | $n_{d1} = 1.516330$ $v_{d1} = 64.1$ |
| $r_2 = \infty$ | (4) | $d_2 = -13.339170$ | $n_{d2} = 1.516330$ $v_{d2} = 64.1$ |
| ($\theta = 40.500000°$) | | | |

-continued

| | | | |
|---|---|---|---|
| $r_3 = 123.40676$ | (5) | $d_3 = 24.500000$ | $n_{d3} = 1.516330$ $v_{d3} = 64.1$ |
| $r_4 = \infty$ | (14) | $d_4 = 24.846988$ | |
| $r_{20} = \infty$ | (6) | | |

Prior art 2

| | | | |
|---|---|---|---|
| $r_0 = \infty$ | (E) | $d_0 = 19.000000$ | |
| $r_1 = \infty$ | (15) | $d_1 = 14.500000$ | $n_{d1} = 1.516330$ $v_{d1} = 64.1$ |
| $r_2 = \infty$ | (4) | $d_2 = -15.339170$ | $n_{d2} = 1.516330$ $v_{d2} = 64.1$ |
| ($\theta = 45.000000°$) | | | |
| $r_3 = 123.40638$ | (5) | $d_3 = 28.000000$ | $n_{d3} = 1.516330$ $v_{d3} = 64.1$ |
| $r_4 = \infty$ | (14) | $d_4 = 22.542094$ | |
| $r_{20} = \infty$ | (6) | | |

Example 7

| | | | |
|---|---|---|---|
| $r_0 = \infty$ | (E) | $d_0 = 20.000000$ | |
| $r_1 = 79.40268$ | (15) | $d_1 = 17.000000$ | $n_{d1} = 1.516330$ $v_{d1} = 64.1$ |
| $r_2 = \infty$ | (4) | $d_2 = -15.000000$ | $n_{d2} = 1.516330$ $v_{d2} = 64.1$ |
| ($\theta = 41.500000°$) | | | |
| $r_3 = 55.04852$ | | $d_2 = -0.500000$ | |
| $r_4 = 140.20084$ | (16) | $d_2 = -1.500000$ | $n_{d3} = 1.805177$ $v_{d3} = 25.4$ |
| $r_5 = 9305.57882$ | (17) | $d_2 = -2.600000$ | $n_{d4} = 1.516330$ $v_{d4} = 64.1$ |
| $r_6 = 144.37844$ | (5) | $d_3 = 2.600000$ | $n_{d5} = 1.516330$ $v_{d5} = 64.1$ |
| $r_7 = 9305.57882$ | | $d_2 = 1.500000$ | $n_{d6} = 1.805177$ $v_{d6} = 25.4$ |
| $r_8 = 140.20084$ | | $d_2 = 0.500000$ | |
| $r_8 = 55.04852$ | | $d_3 = 26.000000$ | $n_{d7} = 1.516330$ $v_{d7} = 64.1$ |
| $r_{10} = \infty$ | (14) (A-spheric) | $d_4 = 7.000000$ | |
| $r_{20} = \infty$ | (6) | | |

Aspherical Coefficients
 10th surface
  k=−1.000000
  A=0.187498×10⁻⁴
  B=C=D=0

Prior art 3

| | | | |
|---|---|---|---|
| $r_0 = \infty$ | (E) | $d_0 = 19.340000$ | |
| $r_1 = 91.35114$ | (15) | $d_1 = 16.000000$ | $n_{d1} = 1.516330$ $v_{d1} = 64.1$ |
| $r_2 = \infty$ | (4) | $d_2 = -17.000000$ | $n_{d2} = 1.516330$ $v_{d2} = 64.1$ |
| ($\theta = 45.000000°$) | | | |
| $r_3 = 50.81031$ | | $d_2 = -0.500000$ | |
| $r_4 = 140.90134$ | (16) | $d_2 = -1.500000$ | $n_{d3} = 1.805177$ $v_{d3} = 25.4$ |
| $r_5 = 9305.57882$ | (17) | $d_2 = -2.600000$ | $n_{d4} = 1.516330$ $v_{d4} = 64.1$ |
| $r_6 = 151.92998$ | (5) | $d_3 = 2.600000$ | $n_{d5} = 1.516330$ $v_{d5} = 64.1$ |
| $r_7 = 9305.57882$ | | $d_2 = 1.500000$ | $n_{d6} = 1.805177$ $v_{d6} = 25.4$ |
| $r_8 = 140.90134$ | | $d_2 = 0.500000$ | |
| $r_8 = 50.81031$ | | $d_3 = 29.000000$ | $n_{d7} = 1.516330$ $v_{d7} = 64.1$ |
| $r_{10} = \infty$ | (14) (A-spheric) | $d_4 = 5.550034$ | |
| $r_{20} = \infty$ | (6) | | |

Aspherical Coefficients
 10th surface
  k=−1.000000
  A=0.252379×10⁻⁴
  B=C=D=0

Figure 13:
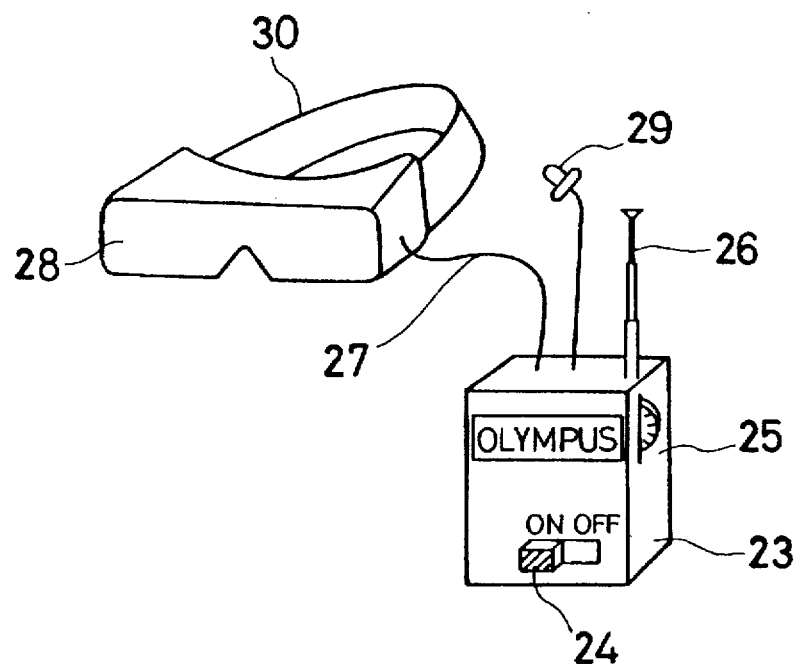
FIG. 13 shows one example of a specific arrangement of the image display apparatus according to the present invention when it is formed as a head-mounted image display apparatus.

An example of a specific arrangement of the above-described image display apparatus when formed as a head-mounted image display apparatus will be explained below. To display an image on the two-dimensional image display device 6, e.g., a liquid crystal display, in the image display apparatus, an arrangement such as that shown in FIG. 13 may be adopted. Referring to FIG. 13, when a switch 24 of a TV signal receiving device 23, for example, is turned on, a TV signal of the channel that has been preset by actuating a TV channel selecting knob 25 is received by an antenna 26. The TV signal thus received is reproduced on the screen of an image display device 6, e.g., a liquid crystal display, a small-sized CRT display, etc., provided in a goggle-type display apparatus body 28 through a cord 27. The image is displayed by an optical arrangement such as that in the above-described Examples. In addition, the device 23 is provided with an earphone 29 to enable the user to listen to the TV sound.

Figure 14:
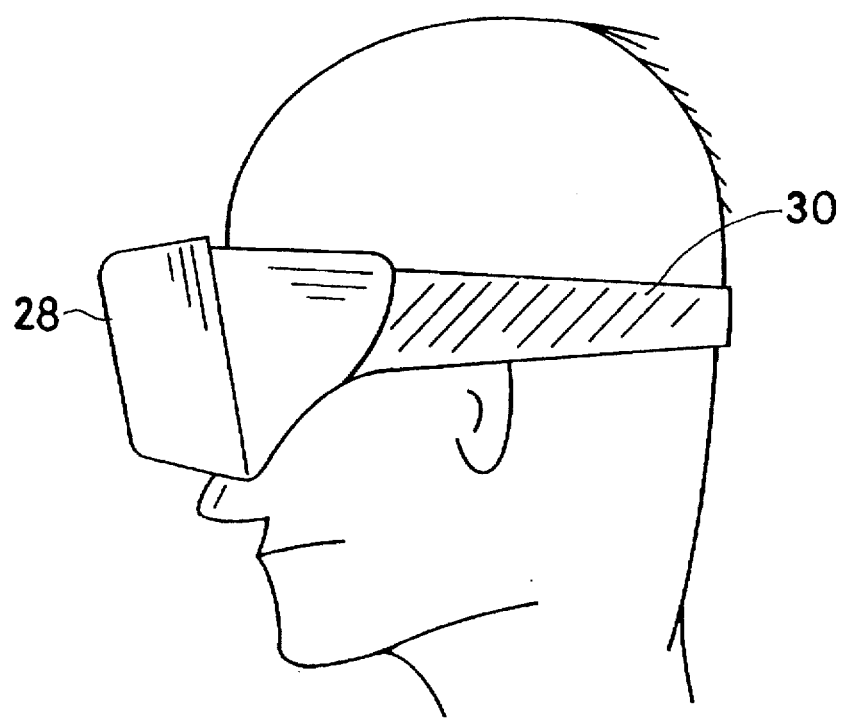
FIG. 14 shows a support member for retaining a goggle-type head-mounted image display apparatus.

The head-mounted image display apparatus according to the present invention may be arranged in the form of a goggle-type image display apparatus in which the display apparatus body 28 is supported by a rubber band 30, for example, as shown in FIG. 14.

Figure 15:
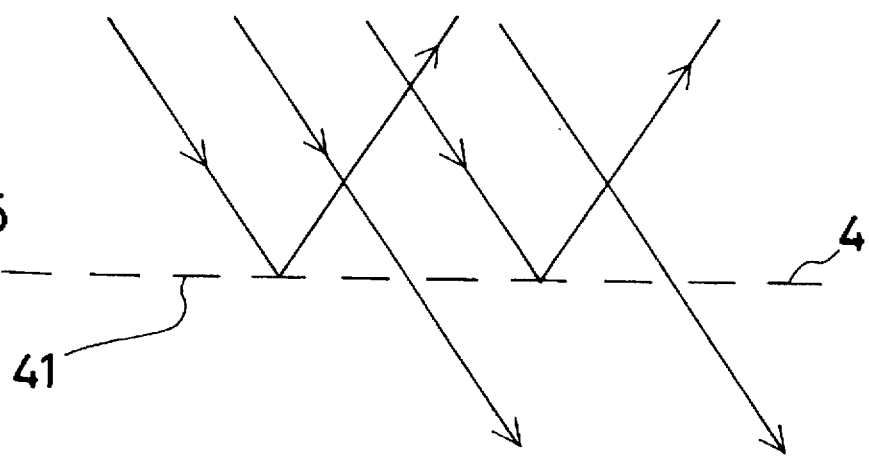
FIG. 15(a), (b) and (c) are views for explanation of specific forms of a beam splitter surface of a prism beam splitter or a half-mirror.
Figure 15:
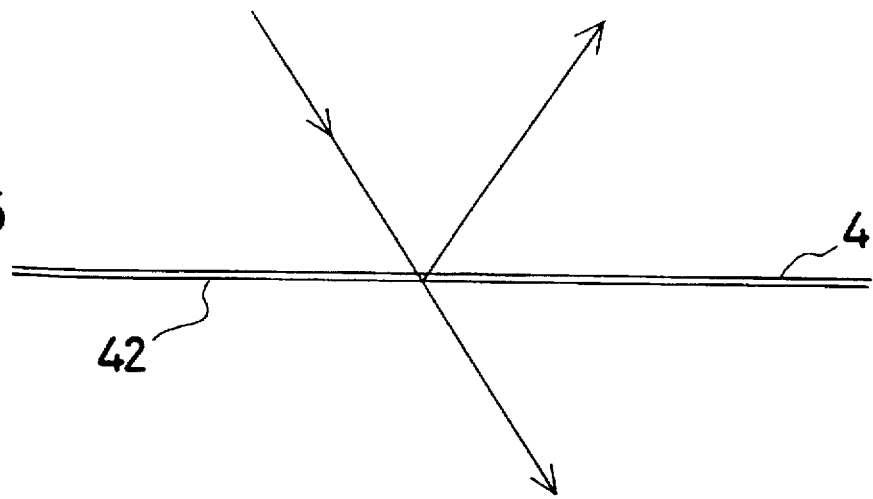
Figure 15:
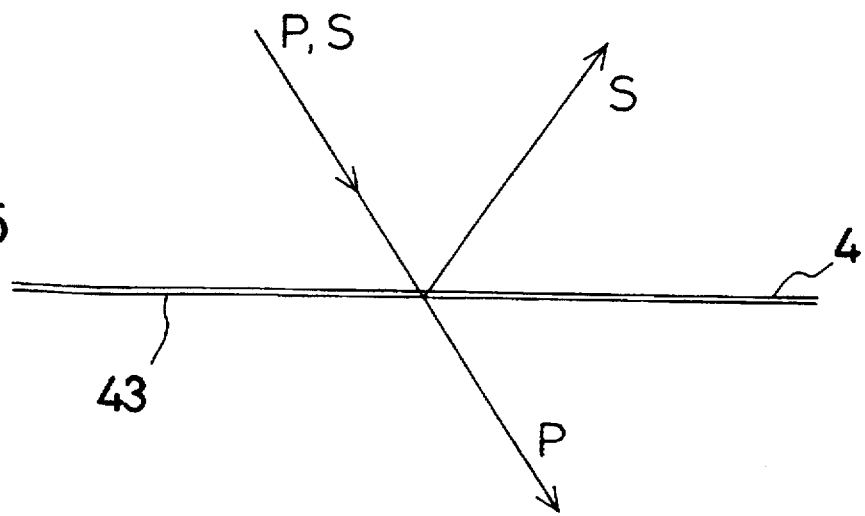

Incidentally, no mention has been made of the form of the beam splitter surface 4 of the prism beam splitter or the half-mirror surface 4 in the foregoing description. In the present invention, it is possible to use any of a partially transmitting-reflecting surface 41, a semitransparent film 42 and a polarizing semitransparent film 43, which may be provided on a cemented surface of a prism or on a transparent substrate, for example, as shown at (a) to (c) in FIG. 15. More specifically, the beam splitter surface or half-mirror surface 4 is a surface that transmits about 50% of the quantity of incident light and reflects about 50% of it. The beam splitter surface or half-mirror surface 4 may be used with the transmittance-to-reflectance ratio varied in the range of from 1:9 to 9:1, in addition to the above. The beam splitter surface or half-mirror surface 4 may be realized by any of the following methods: one in which the quantity of incident light is divided in terms of area; another in which the quantity of incident light is divided in terms of light intensity; and another in which the quantity of incident light is divided in terms of both area and intensity. In the case of the partially transmitting-reflecting surface 41 shown at (a) in FIG. 15, the quantity of incident light is divided in terms of area. In this case, reflection coating of aluminum or the like is provided on a cemented surface of a prism or on a transparent substrate (the refractive index n of which is larger than 1, i.e., n>1) at intervals, for example, in a lattice-like pattern of about several μm to 0.1 mm, whereby a reflectance and a transmittance are set overall (macrocosmically) by the ratio of the area of the reflecting portions to the area of the transmitting portions. In the case of the semitransparent film 42 shown at (b) in FIG. 15, a cemented surface of a prism or a transparent substrate (the refractive index n of which is larger than 1, i.e., n>1) is coated with a metallic, extremely thin film, e.g., an extremely thin film of aluminum or chromium, or a dielectric multilayer film of SiO₂, MgF₂, etc., thereby dividing the quantity of incident light. The polarizing semitransparent film 43 shown at (c) in FIG. 15 divides the quantity of incident light by separating polarized light components of the incident light. More specifically, the polarizing semitransparent film 43 is coated on a cemented surface of a prism or on a transparent substrate to allow p-and s-polarized light components to be selectively transmitted or reflected to thereby divide the quantity of the incident light.

Figure 16:
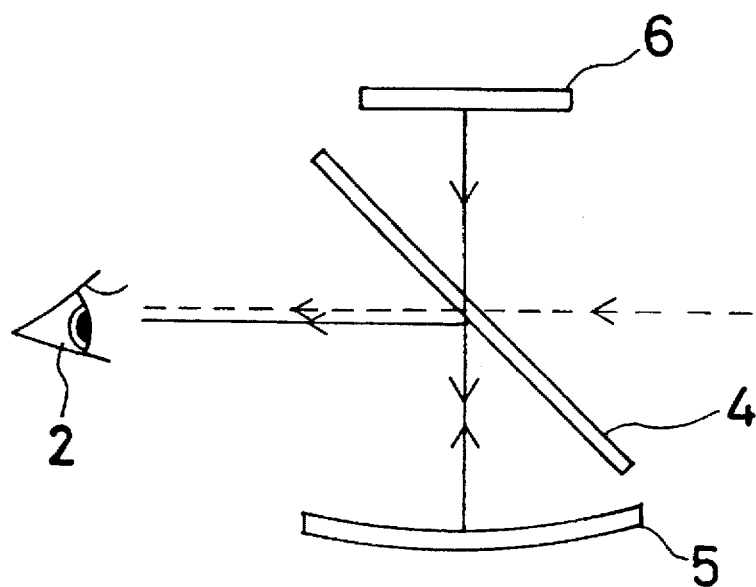
FIG. 16 is a sectional view showing one type of head-mounted image display apparatus to which the present invention may be applied.
Figure 17:
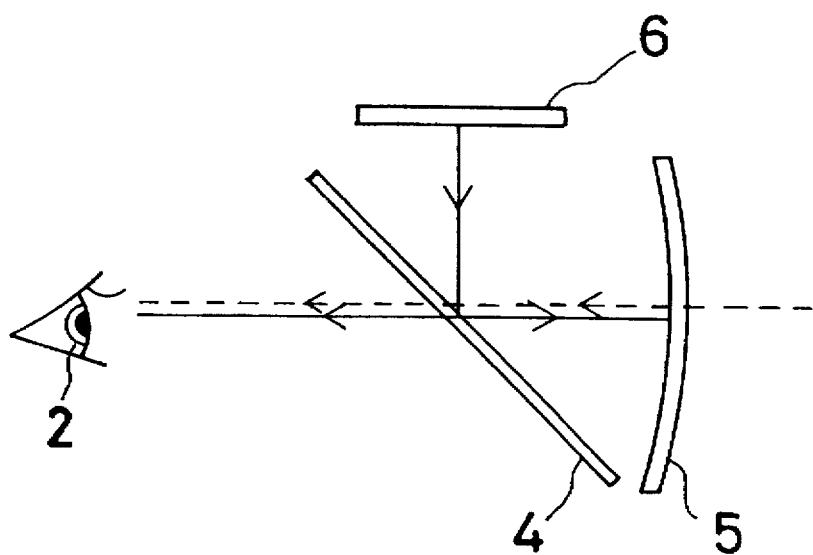
FIG. 17 is a sectional view showing another type of head-mounted image display apparatus to which the present invention may be applied.
Figure 18:
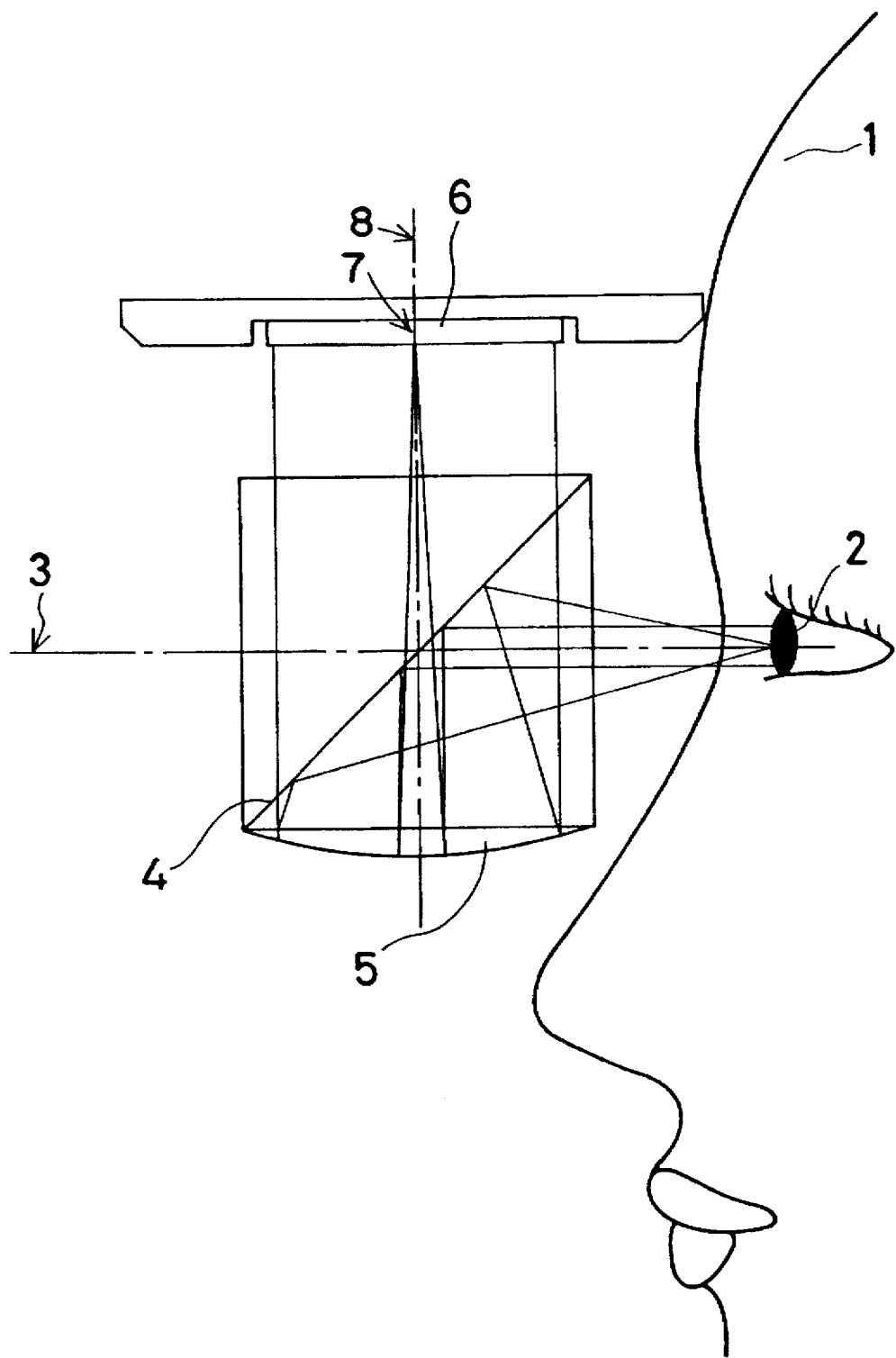
FIG. 18 is a sectional view showing one example of conventional head-mounted image display apparatus.

Although the head-mounted image display apparatus of the present invention has been described above by way of some examples, it should be noted that the present invention is not necessarily limited to these examples, and that various changes and modifications may be imparted thereto. Although in the foregoing description, the magnifying reflecting mirror 5 is disposed outside the visual field so as to face the image display device 6, as shown in FIG. 16, the present invention may also be applied to another type of image display apparatus in which only the image display device 6 is disposed outside the visual field, and the magnifying reflecting mirror 5 is disposed on the side of the half-mirror 4 which is opposite to the side thereof which faces the observer's eyeball 2, as shown in FIG. 17. In this case, a bundle of rays from the image display device 6 is first reflected by the half-mirror 4 and then reflected by the magnifying reflecting mirror 5 and transmitted through the half-mirror 4 to reach the eyeball 2. In the case of an image display apparatus of the type as shown in FIG. 17, it is possible to provide a function that enables the user to observe the outside world in addition to an image displayed on the image display device 6 by using a half-mirror which is in any of the forms shown in FIG. 15 as the magnifying reflecting mirror 5 in place of the totally reflecting mirror, and providing a shutter on the outer side of the magnifying reflecting mirror 5. Thus, an outside, real world image can be selectively viewed superimposed on an image of the image display device 6 by actuating the shutter.

As will be clear from the foregoing description, according to the image display apparatus of the present invention, either or both the optical path splitting device and the concave ocular mirror are decentered with respect to a reference axis perpendicularly intersecting the observer's visual axis lying when he or she sees forward. Accordingly, the display center of the two-dimensional display device can be shifted away from the observer's head. Thus, there is no possibility of the two-dimensional display device interfering with the observer's head. It is therefore possible to widen the field angle for observation without increasing the overall size of the apparatus.

In addition, when the angle made between the line normal to the half-mirror or half-mirror surface and the optical axis of the image display device is set so as to be smaller than π/4, it is possible to reduce the area of the half-mirror or the volume of the prism beam splitter. In addition, the distance between the projection optical system and the image display device shortens, so that the diopter adjustable range enlarges. Further, the distance (working distance) between the projection optical system and the observer's eye lengthens. Accordingly, the user can observe a displayed image with his/her spectacles on.

What we claimed is:

1. An image display apparatus including:
   an image display device having a screen for displaying an image,
   a semitransparent reflecting surface disposed at an angle of inclination to an optical axis which is determined by a bundle of rays emitted from said display screen, said optical axis is being defined as an image axis, and
   a magnifying reflecting mirror disposed so that an optical axis reflected by said semitransparent reflecting surface goes to and returns from said magnifying reflecting mirror to form a turn-back optical path,
   wherein the improvement is characterized in that:
      said semitransparent reflecting surface is a surface having both reflecting and transmitting functions composed of transmitting and reflecting regions which are locally distinguished from each other;
      a straight line that connects an eye point and a position where the optical axis reflected by said magnifying reflecting mirror is transmitted by said surface having both reflecting and transmitting functions is defined as a visual axis; and
      said surface having both reflecting and transmitting functions is disposed at a tilt to said image axis to change the angle of inclination of said surface having both reflecting and transmitting functions to said image axis so that an angle ($\phi$) made by intersection of said image axis extending from said image display device and said visual axis is extending from said eye point is larger than 90° ($\phi$>90°), a space between said surface having both reflecting and transmitting functions and said magnifying reflecting mirror being formed from a prism which is filled with a medium having a refractive index (n) larger than 1 (n>1).

2. An image display apparatus including:
   an image display device having a screen for displaying an image,
   a semitransparent reflecting surface which is a surface having both reflecting and transmitting functions disposed at an angle of inclination to an optical axis which is determined by a bundle of rays emitted from said display screen, said optical axis being defined as an image axis, and
   a magnifying reflecting mirror disposed so that an optical axis reflected by said semitransparent reflecting surface goes to and returns from said magnifying reflecting mirror to form a turn-back optical path
   wherein the improvement is characterized in that:
      said magnifying reflecting mirror is a partially transmitting-reflecting surface composed of transmitting and reflecting regions which are locally distinguished from each other;
      a straight line that connects an eye point and a position where the optical axis reflected by said partially transmitting-reflecting surface is transmitted by said semitransparent reflecting surface is defined as a visual axis; and
      said partially transmitting-reflecting surface is disposed at a tilt to said image axis so that an angle ($\phi$) made by intersection of said image axis extending from said image display device and said visual axis extending from said eye point is larger than 90° ($\phi$>90°), a space between said semitransparent reflecting surface and said magnifying reflecting mirror being formed from a prism which is filled with a medium having a refractive index (n) larger than 1 (n>1).

3. A face-mounted image display apparatus including
   a face-mounted unit having an image display device with a screen for displaying an image, a semitransparent reflecting surface which is a surface having both reflecting and transmitting functions disposed at an angle of inclination to an optical axis which is determined by a bundle of rays emitted from said display screen, said optical axis is being defined as an image axis, and a magnifying reflecting mirror disposed so that an optical axis leaving said semitransparent reflecting surface goes to and returns from said magnifying reflecting mirror to form a turn-back optical path, and
   a support member for retaining said face-mounted unit on an observer's head,
   wherein the improvement is characterized in that:
      a straight line that connects an eye point and a position where the optical axis reflected by said magnifying reflecting mirror is tangent to said semitransparent reflecting surface is defined as a visual axis; and
      at least one of said semitransparent reflecting surface and said magnifying reflecting mirror is decentered so that an angle ($\phi$) made by intersection of said image axis extending from said image display device and said visual axis extending from said eye point is larger than 90° (φ>90), a space between said semitransparent reflecting surface and said magnifying reflecting mirror being formed from a prism which is filled with a medium having a refractive index (n) larger than 1 (n>1).

4. An image display apparatus according to claim 1, 2, or 3, wherein said semitransparent reflecting surface is formed from a half-mirror.

5. An image display apparatus according to claim 1, 2, or 3, wherein said semitransparent reflecting surface is formed from a prism.

6. An image display apparatus according to claim 1, 2, or 3, wherein an angle made between a line normal to said semitransparent reflecting surface and said image axis is smaller than π/4.

7. An image display apparatus according to claim 6, wherein said semitransparent reflecting surface is formed from a half-mirror, and an angle θ between a line normal to said half-mirror and said image axis satisfies the following condition:

$$\pi/4 - \phi/2 \leq \theta < \pi/4$$

where φ is a half of a vertical field angle.

8. An image display apparatus according to claim 6, wherein said semitransparent reflecting surface is formed from a prism beam splitter having a half-mirror surface, and an angle θ between a line normal to said half-mirror surface and said image axis satisfies the following condition:

$$\pi/4 - \phi'/2 \leq \theta < \pi/4$$

where $\phi' = \sin^{-1}(\sin\phi/n)$, φ is a half of a vertical field angle, and n is the refractive index of a medium constituting said prism.

9. An image display apparatus according to claim 1 or 2, wherein said partially transmitting-reflecting surface is a surface formed by partially coating aluminum on a surface of an optical member having a refractive index (n) larger than 1 (n>1).

10. A head-mounted image display apparatus having an image display device, a semitransparent reflecting mirror, which is a surface having both reflecting and transmitting functions and a magnifying reflecting mirror, in which said image display device is used as an object point of said magnifying reflecting mirror, and the object point is projected in the air as an enlarged image for an observer without effecting image formation in an optical path, wherein the improvement is characterized in that:
at least one of said semitransparent reflecting mirror and said magnifying reflecting mirror are decentered so that a display center of said image display device is selectively shiftable away from the observer's head with respect to a reference axis which perpendicularly intersects an observer's visual axis laying when he or she sees forward, a space between said semitransparent reflecting surface and said magnifying reflecting mirror being formed from a prism which is filled with a medium having a refractive index (n) larger than 1 (n>1).

* * * * *